3,729,521
PROCESS FOR THE DISPROPORTIONATION OF
PETROLEUM HYDROCARBONS
Louis C. Gutberlet, Crown Point, and Ralph J. Bertolacini, Chesterton, Ind., and Harry M. Brennan, Naperville, Ill., assignors to Standard Oil Company, Chicago, Ill.
Filed Sept. 1, 1970, Ser. No. 68,656
Int. Cl. C07c 3/00
U.S. Cl. 260—672 T       39 Claims

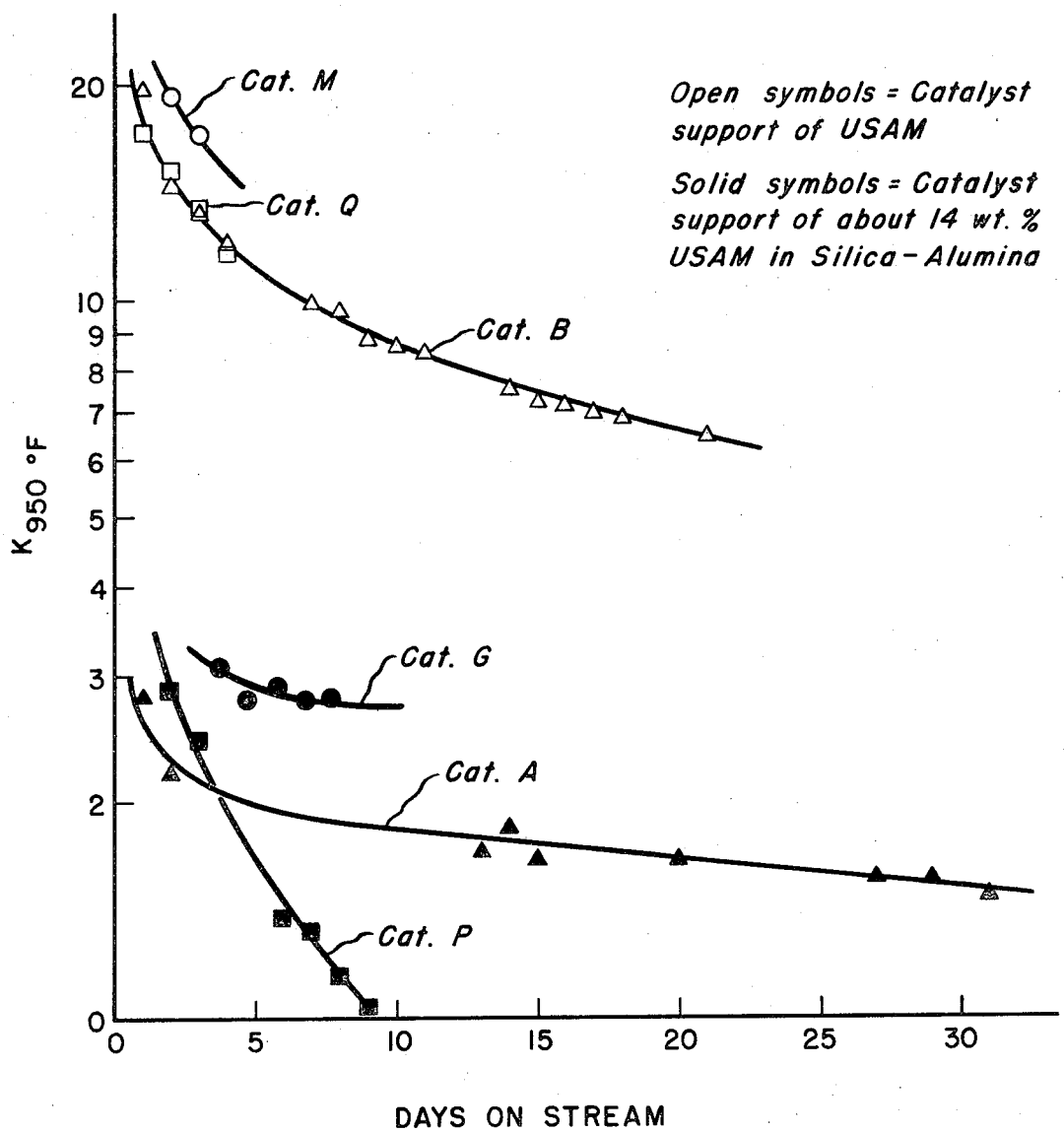

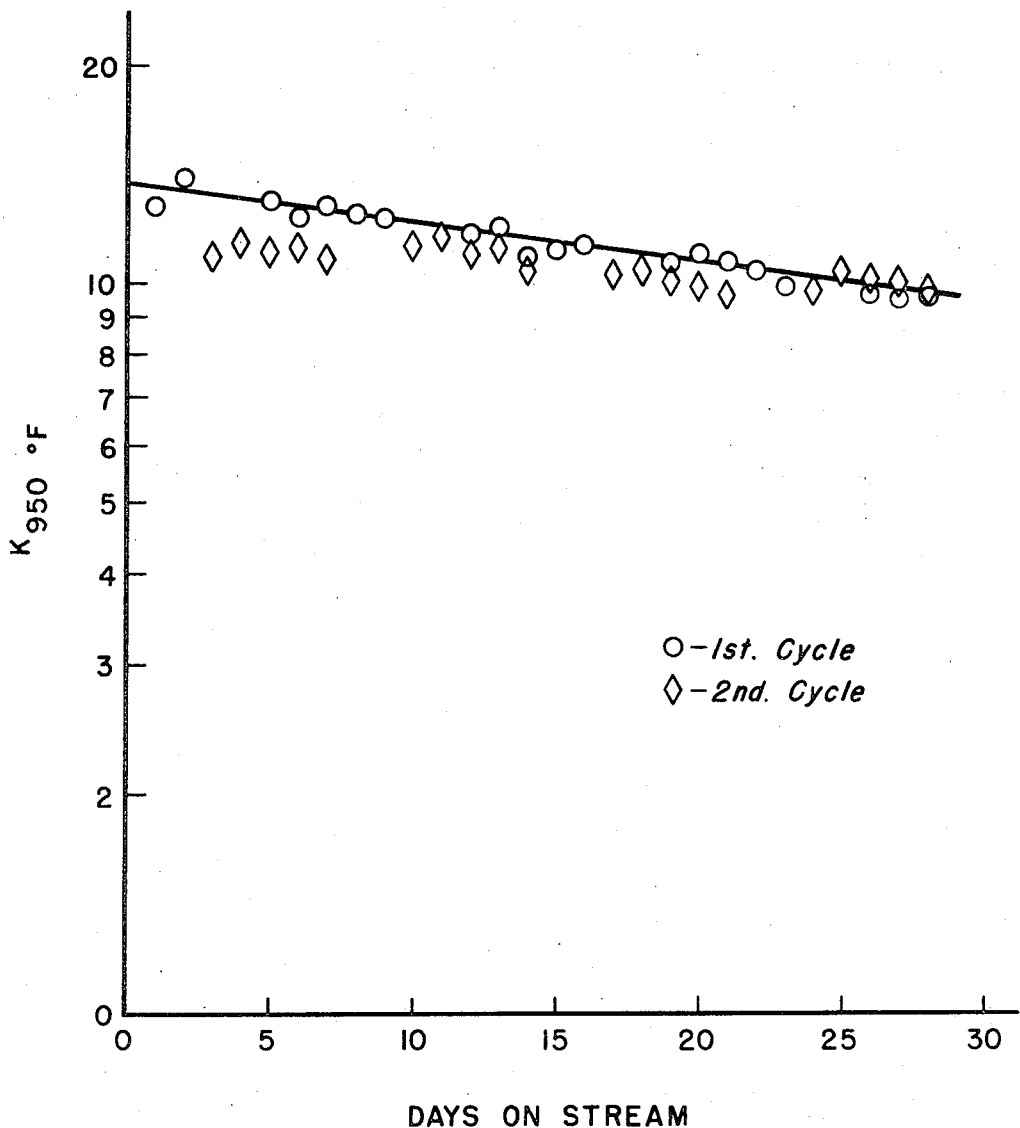

ABSTRACT OF THE DISCLOSURE

The process comprises contacting in a reaction zone a petroleum hydrocarbon fraction with a catalytic composition under suitable disproportionation conditions, said catalytic composition comprising a member selected from the group consisting of (1) a metal of Group VI-B of the Periodic Table of Elements, (2) a metal of Group VIII of the Periodic Table, (3) the oxide of a metal of Group VI-B, (4) the sulfide of a metal of Group VI-B, (5) the oxide of a metal of Group VIII, (6) the sulfide of a metal of Group VIII, and (7) mixtures thereof deposited upon a solid acidic cracking support, which support comprises an ultrastable, large-pore crystalline aluminosilicate material and a refractory inorganic oxide. The preferred metal of Group VI-B is molybdenum and the preferred metal of Group VIII is cobalt. The catalyst is subjected to a sulfur-providing compound to inhibit demethanation.

BACKGROUND OF THE INVENTION

The present invention is directed to a process for the conversion of petroleum hydrocarbons. More particularly, it is directed to a process for the disproportionation of petroleum hydrocarbons. Still more particularly, it is directed to a vapor-phase process for the disproportionation of alkylaromatic hydrocarbons.

The invention pertains to a process for treating mineral oils which results in a chemical alteration of at least some of the hydrocarbon molecules of the mineral oils to form mineral oils having different properties and different chemical structures. These different chemical compounds result from the intermolecular migration of alkyl groups. For example, in the case of the disproportionation of toluene, there results benzene and the various xylenes.

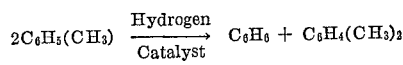

In the case of aromatic hydrocarbons, rearrangement of alkyl groups in the presence of Friedel-Crafts catalysts is well known. Such rearrangements as the transfer of alkyl groups from the toluene to form benzene and xylenes and the transfer of alkyl groups from xylenes to form toluene and trimethylbenzenes are catalyzed by strongly acidic catalysts. When Friedel-Crafts-type catalysts are employed, the reactions occur in the liquid phase. However, vapor-phase disproportionation reactions can be conducted in the presence of suitable solid catalysts.

A new vapor-phase disproportionation process has been found. The catalysts employed in this process are very active catalytic compositions. It is believed that these catalysts are not only superior catalysts for disproportionation, but also are suitable catalysts for hydrocracking, aromatic dealkylation and the isomerization of aromatics and paraffins.

SUMMARY OF THE INVENTION

Broadly, in accordance with the present invention, there is provided a process for the disproportionation of a petroleum hydrocarbon fraction, which process comprises contacting in a reaction zone said petroleum hydrocarbon fraction with a catalytic composition under suitable disproportionation conditions. Said catalytic composition comprises a member selected from the group consisting of (1) a metal of Group VI-B of the Periodic Table of Elements, (2) a metal of Group VIII of the Periodic Table, (3) the oxide of a metal of Group VI-B, (4) the sulfide of a metal of Group VI-B, (5) the oxide of a metal of Group VIII, (6) the sulfide of a metal of Group VIII, and (7) mixtures thereof deposited upon a solid acidic cracking support. This solid acidic cracking support comprises an ultrastable, large-pore crystalline aluminosilicate material and a refractory inorganic oxide. The preferred metal of Group VI-B is molybdenum, while the preferred Group VIII metal is cobalt. Preferably, the ultrastable, large-pore crystalline aluminosilicate material is suspended in and distributed throughout a matrix of the refractory inorganic oxide. The preferred refractory inorganic oxide is a catalytically active alumina.

The ultrastable, large-pore crystalline aluminosilicate material is present in an amount within the range of about 5 to about 90 weight percent, based upon the weight of said support. The preferred Group VI-B metal, molybdenum, may be present in an amount within the range of about 4 to about 15 weight percent, expressed as $MoO_3$ and based upon the weight of the catalytic composition. The preferred Group VIII metal, cobalt, may be present in an amount within the range of about 2 to about 5 weight percent, expressed as $CoO$ and based upon the weight of the catalytic composition.

The catalysts of this invention are very active. Therefore, the catalysts are subjected to a treatment with a sulfur-providing compound to inhibit the demethanation reaction which normally occurs over such catalyst when the metals of the catalyst are primarily in the reduced state. Such sulfur-providing compounds as hydrogen sulfide and carbon disulfide may be employed.

An embodiment of the process of this invention is a process to convert a petroleum hydrocarbon stream comprising single-ring aromatic hydrocarbons wherein alkyl groups are transferred from one molecule to another. This latter process comprises contacting the petroleum hydrocarbon stream in a hydrocarbon-conversion zone with a catalytic composition of this invention in the presence of a hydrogen-affording gas under suitable hydrocarbon disproportionation conditions.

Accordingly, a specific embodiment of the process of this invention is a process for the disproportionation of a petroleum hydrocarbon fraction comprising toluene. The process of this specific embodiment comprises contacting the petroleum hydrocarbon fraction with a catalytic composition of this invention in the presene of a hydrogen-affording gas under disproportionation conditions comprising an average temperature between about 700° F. and about 1100° F., a pressure of about 100 to about 1,000 p.s.i.g., a liquid hourly space velocity (LHSV) of about 0.1 to about 20 volumes of hydrocarbon per hour per volume of catalyst, and a hydrogen-to-hydrocarbon ratio of about 1,000 standard cubic feet of hydrogen per barrel of hydrocarbon (s.c.f.b.) to about 50,000 s.c.f.b., and recovering the disproportionated product and separating it into its various component hydrocarbons. The catalyst of this specific embodiment of the instant invention comprises cobalt and molybdenum, their oxides, sulfides, and/or mixtures thereof on a solid acidic cracking component comprising 35 weight percent ultrastable, large-pore crystalline aluminosilicate material suspended in and distributed uniformly throughout a matrix of catalytically active alumina. The catalyst is pretreated with gas containing a minor amount of hydrogen sulfide, e.g., about 8 percent hydrogen sulfide. The pretreatment is carried out at a pressure of about 300 p.s.i.g. for 2 hours. The flow rate of the pretreating gas is maintained between about 50,000 and about 300,000 standard cubic feet per hour per ton of catalyst. The temperature of the catalyst is initially about 500° F. and is raised to a temperature of about 750° F. during the first hour and then maintained at the latter temperature during the second hour of the pretreatment.

DESCRIPTION OF THE DRAWINGS

Six figures accompany this application. These figures may be used with the description presented hereinafter to enable one to more easily comprehend the present invention.

FIG. 5 exhibits the effect of hydrogenation components and the concentration of aluminosilicate material on catalyst deactivation for the disproportionation of toluene.

FIG. 6 demonstrates the regenerability of a catalyst preferred for the present invention for the disproportionation of toluene.

DESCRIPTION AND PREFERRED EMBODIMENTS OF THE INVENTION

Figure 1:
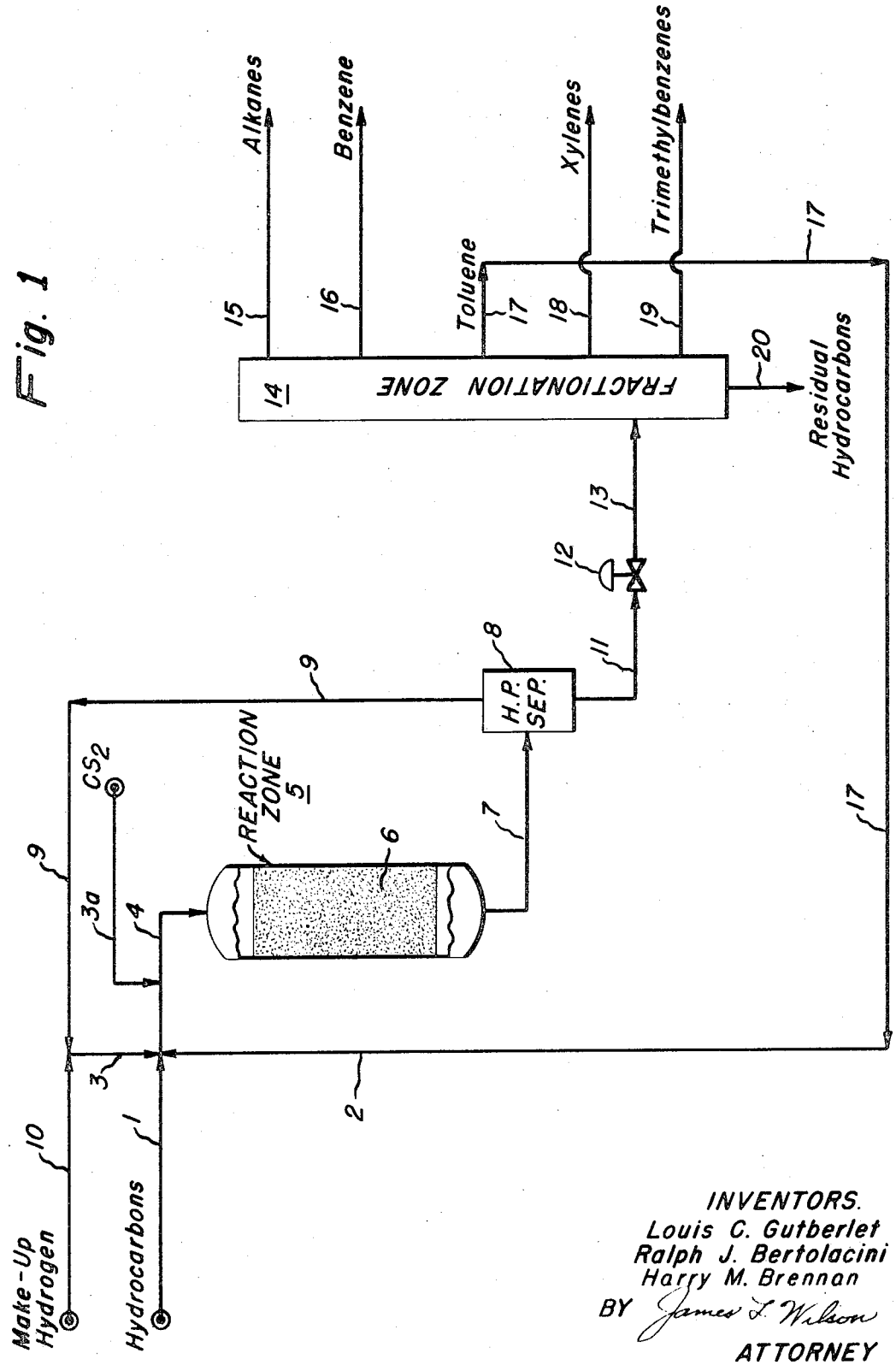
FIG. 1 is a simplified process flow scheme of a specific embodiment of the process of the present invention.

The process of this invention will be understood from the following description and examples.

The process of this invention is a process for the disproportionation of petroleum hydrocarbons. Particularly, it is a process for the disproportionation of alkyl aromatic hydrocarbons wherein the alkyl groups are transferred from one molecule to another.

The success of this disproportionation process is due primarily to the use of particular catalytic compositions which are employed therein and the operating conditions that are used.

Typical feedstocks of the present invention are petroleum hydrocarbon streams which contain single-ring aromatic hydrocarbons which boil below about 650° F. Such aromatic hydrocarbon streams may be a petroleum hydrocarbon fraction which contains aromatic or it may be a purified aromatic hydrocarbon. For example, the feedstock of this invention may contain toluene, ortho-xylene, meta-xylene, and para-xylene, trimethylbenzenes, and tetramethylbenzenes.

Typically, the feedstock is mixed with a hydrogen-affording gas and preheated to a suitable disproportionation temperature, and then transferred to the disproportionation reaction zone, which may contain one or more reactors. Advantageously, the feed is substantially completely vaporized before being introduced into the reaction zone.

The feedstock is contacted in the disproportionation reaction zone with the hereinafter described catalyst in the presence of hydrogen-affording gas. Advantageously, a hydrogen-to-hydrocarbon ratio of at least 1,000 s.c.f.b. is employed, and the hydrogen-to-hydrocarbon ratio may range up to 50,000 s.c.f.b. Preferably, the hydrogen-to-hydrocarbon ratio may range between about 5,000 s.c.f.b. and 30,000 s.c.f.b. Other operating conditions comprise an elevated temperature of about 700° F. to about 1100° F., preferably about 850° F. to about 1000° F.; an elevated pressure of about 100 p.s.i.g. to about 1,000 p.s.i.g., preferably about 200 p.s.i.g. to about 500 p.s.i.g.; and LHSV of about 0.1 to about 20 volumes of hydrocarbon per hour per volume of catalyst, preferably about 1 to about 10 volumes of hydrocarbon per hour per volume of catalyst.

The exothermic demethanation reaction that occurs in the disproportionation reaction zone may be controlled by the treatment of the catalyst with sulfur compounds, such as hydrogen sulfide and carbon disulfide, either prior to or at the start of the disproportionation reaction. If hydrogen sulfide is used, the catalyst is advantageously subjected to the hydrogen sulfide prior to its use as a catalyst for disproportionation. If carbon disulfide is employed, it may be added to the hydrocarbon feed during the initial stages of the run. The treatment must be of such duration and the amount of sulfur-providing compound must be such that substantial amounts of the metals of the catalyst are converted to their sulfides. It is not known at this time what comprises substantial amounts of the metals. However, if the metals are in the reduced state, they will more actively catalyze the demethanation reaction. Therefore, the greater the percentage of the metal in the sulfide form, the better is the inhibition of the demethanation.

The catalytic composition of the process of this invention comprises a hydrogenation component disposed upon a solid acidic cracking support. The hydrogenation component comprises a member selected from the group consisting of (1) a metal of Group VI–B of the Periodic Table of Elements, (2) a metal of Group VIII of the Periodic Table, (3) the oxide of a metal of Group VI–B, (4) the sulfide of a metal of Group VI–B, (5) the oxide of a metal of Group VIII, (6) the sulfide of a metal of Group VIII, and (7) mixtures thereof. The pertinent Periodic Table of Elements may be found on the inside of the back cover of Handbook of Chemistry and Physics, 45th ed., Robert C. Weast, editor, Chemical Rubber Company, Cleveland, Ohio (1964). The preferred Group VI–B metal is molybdenum and the preferred Group VIII metal is cobalt. Molybdenum is present in an amount within the range of about 4 to about 15 weight percent, expressed as $MoO_3$ and based upon the weight of the catalytic composition, while cobalt is present in an amount within the range of about 2 to about 5 weight percent, expressed as CoO and based upon the weight of the catalytic composition.

The solid acidic cracking support of the catalyst employed in the process of the present invention comprises an ultrastable, large-pore crystalline aluminosilicate material and a suitable refractory inorganic oxide. Preferably, the ultrastable, large-pore crystalline aluminosilicate material is suspended in and distributed throughout the matrix of the refractory inorganic oxide. The ultrastable, large-pore crystalline aluminosilicate material is present in an amount within the range of about 5 to about 90 weight percent, based upon the weight of the support.

The refractory inorganic oxide component of the support of the catalyst that is employed in the process of the present invention may be an oxide of a single metal, or it may be a mixture of the oxides of two or more metals of Groups III and IV of the Periodic Table of Elements. For example, the refractory inorganic oxide component may be catalytically active alumina, or it may be a mixture of silica and alumina, or it may be a mixture of boria, titania, and alumina. The preferred refractory inorganic oxide is a catalytically active alumina.

The aluminosilicate material that is a component of the support of the catalytic composition that is employed in the process of the present invention is an ultrastable, large-pore crystalline aluminosilicate material. It is sometimes hereinafter referred to as "ultrastable aluminosilicate material." It is believed to be quite different from the prior art aluminosilicates employed in hydrocarbon conversion catalysts and is an ultrastable material, that is, it is stable to exposure to elevated temperatures and is stable to repeated cycles of wetting and drying.

This ultrastable aluminosilicate material is large-pore material. By large pore material is meant a material that has pores which are sufficiently large to permit the passage thereinto of benzene molecules and larger molecules, and the passage therefrom of reaction products. For the in catalysts that are employed in petroleum hydrocarbon conversion processes, it is preferred to employ a large-pore crystalline aluminosilicate material having a pore size of at least 8 to 10 angstrom units (A.). The ultrastable aluminosilicate material of the catalyst of the present invention possesses such a pore size.

An example of the ultrastable, large-pore crystalline aluminosilicate material that is employed in the catalyst of this invention is Z-14US Zeolite, which is described in the U.S. Pat. 3,293,192.

The ultrastable aluminosilicate material is quite stable to exposure to elevated temperatures. This stability may be demonstrated by its surface area after calcination at 1725° F. For example, after a two-hour calcination at 1725° F., a surface area that is greater than 150 square meters per gram (m.$^2$/gm.) is retained. Moreover, its stability is demonstrated by its surface area after a steam treatment with an atmosphere of 25 percent steam at a temperature of 1525° F. for 16 hours. The surface area after this steam treatment is greater than 200 m.$^2$/gm. This stability to elevated temperatures is discussed in U.S. Pat. 3,293,192.

The ultrastable aluminosilicate material exhibits extremely good stability toward wetting, which is defined as that ability of a particular aluminosilicate material to retain surface area or nitrogen-adsorption capacity after contact with water or water vapor. It has been found that ultrastable, large-pore crystalline aluminosilicate material containing about 2 percent sodium (the "soda" form of the ultrastable aluminosilicate material) exhibited a loss in nitrogen-adsorption capacity that is less than 2 percent per wetting, when tested for stability to wetting by subjecting the material to a number of consecutive cycles, each cycle consisting of a wetting and a drying.

The cubic unit cell dimension of the ultrastable, large-pore crystalline aluminosilicate material is within the range of about 24.20 A. to about 24.55 A.

The infrared spectra of dry ultrastable, large-pore crystalline aluminosilicate material always show a prominent band near 3700 cm.$^{-1}$ (3695±5 cm.$^{-1}$), a band near 3750 cm.$^{-1}$ (3745±5 cm.$^{-1}$), and a band near 3625 cm.$^{-1}$ (±10 cm.$^{-1}$). The band near 3750 cm.$^{-1}$ is typically seen in the spectra of all synthetic faujasites. The band near 3625 cm.$^{-1}$ is usually less intense and varies more in apparent frequency and intensity with different levels of hydration. The band near 3700 cm.$^{-1}$ is usually more intense than the 3750 cm.$^{-1}$ band. The band near 3700 cm.$^{-1}$ and the band near 3625 cm.$^{-1}$ appear to be characteristics of the ultrastable aluminosilicate material.

It is believed that a substantial proportion or amount of this ultrastable, large-pore crystalline aluminosilicate material is characterized by the apparently unique, well-defined hydroxyl bands near 3700 cm.$^{-1}$ and near 3625 cm.$^{-1}$. By a substantial proportion is meant a major part of the ultrastable aluminosilicate material, i.e., an amount in excess of 50 weight percent.

While the above-mentioned two bands which appear near 3700 cm.$^{-1}$ and near 3625 cm.$^{-1}$, respectively, appear to be characteristic of the ultrastable aluminosilicate material which is a component of the catalytic composition employed in this invention and have not as yet been described in the literature, it is quite possible that they might appear, at a weak intensity, in the infrared spectra of a decationized Y-type or other aluminosilicate material, if that aluminosilicate material were to be subjected to the proper treatment employing the proper conditions.

It is believed that the ultrastable, large-pore crystalline aluminosilicate material of the catalytic composition that is employed in the process of this invention can be identified properly by the hydroxyl infrared bands near 3700 cm.$^{-1}$ and near 3625 cm.$^{-1}$, particularly the former, when considered in conjunction with the characteristic small cubic unit cell dimension. For example, such identification or description will distinguish the ultrastable aluminosilicate material from the "high-silica" faujasites described in Dutch patent application 6707192, which "high-silica" faujasites have the small cubic unit cell but do not exhibit the 3700 cm.$^{-1}$ and 3625 cm.$^{-1}$ infrared bands. Furthermore, while unstable decationized Y-type aluminosilicate materials may provide hydroxyl infrared bands near 3700 cm.$^{-1}$ and near 3625 cm.$^{-1}$, if such aluminosilicate materials were to receive the proper treatment, they do not exhibit the appropriate smaller cubic unit cell dimension that is characteristic of the ultrastable, large-pore crystalline aluminosilicate material.

In addition to the unique hydroxyl infrared bands and the smaller cubic unit cell dimension, the ultrastable, large-pore crystalline aluminosilicate material is characterized by an alkali content that is less than 1 weight percent.

The ultrastable, large-pore crystalline aluminosilicate material can be prepared from certain faujasites by subjecting the latter to special treatment under specific conditions. The preparation usually involves a first step wherein most of the alkali metal cation is cation-exchanged with an ammonium salt solution to leave approximately enough alkali metal cations to fill the bridge positions in the faujasite structure. After this cation-exchange treatment, the aluminosilicate material is subjected to a heat treatment at a temperature within the range of about 700° C. (1292° F.) to about 800° C. (1472° F.), or higher. The heat-treated aluminosilicate material is then subjected to further cation-exchange treatment to remove additional residual alkali metal cations. A typical preparation of the ultrastable, large-pore crystalline aluminosilicate material is considered in U.S. Pat. 3,293,192.

The catalytic composition that is employed in the process of the present invention can be prepared in several ways. For example, the ultrastable, large-pore crystalline aluminosilicate material can be pulverized into a finely-divided state and then physically admixed with a finely-divided powder of the selected refractory inorganic oxide component. After a thorough blending of the two solid components, the resulting mixture may be co-pelleted, and impregnated with one or more solutions of the metals of the hydrogenation component, i.e., the metals of Group VI-B and Group VIII. The resulting composition is thoroughly mixed to form a blended composition, which is subsequently dried to a moisture content ranging from about 20 to 40 weight percent, based upon the total weight of the composition. The dried material is then calcined at a temperature within the range of about 900° to about 1100° F.

The following is another method of preparation. The ultrastable, large-pore crystalline aluminosilicate material in a finely-divided state may be added to a hydrosol or a hydrogel of the refractory inorganic oxide component and blended therein to form a homogenous mixture. The hydrogenation component, i.e., the metals of Group VI-B and Group VIII are added in the form of heat-decomposable components to this homogenous mixture. These heat-decomposable components may be added in a single solution or in several solutions. The resulting composition is then thoroughly mixed, dried, and calcined, as described above.

Alternatively, the homogenous mixture of the above paragraph may be dried and pelleted, or dried, and the resulting material may be impregnated with the hydrogenation component, followed by drying and calcining, as described above.

Embodiments of the process of the present invention may be found in the following examples. These embodiments and examples are presented for purposes of illustration only and are not intended to limit the scope of the invention.

EXAMPLE 1

A specific embodiment of the process of the present invention is presented in this example. A simplified process flow scheme for this embodiment is depicted in FIG. 1. Auxiliary equipment, such as pumps and heat exchangers, is not shown in the drawing. Such auxiliary equipment is well-known to those skilled in the art and the uses and locations of this equipment in this particular process system will be recognized easily by those having ordinary skill in the art.

Fresh feedstock comprising toluene is introduced into the process system by way of line 1. Recycle hydrocarbons from line 2 are mixed with the fresh feedstock in line 1. Hydrogen-containing gas is introduced into the hydrocarbon stream by way of line 3, carbon disulfide is added by way of line 3a, and the resulting mixture is passed through line 4 and heat-exchange equipment (not shown) into reaction zone 5. Reaction zone 5 contains a catalyst bed or catalyst beds 6. The catalyst in this reaction zone comprises 2.5 percent by weight CoO and 10 weight percent by weight $MoO_3$ on a co-catalytic support comprising 35 percent by weight ultrastable, large-pore crystalline aluminosilicate material suspended in a matrix of catalytically active alumina. Operating conditions in reaction zone 5 comprises a pressure of 300 p.s.i.g., a temperature of about 850° F. to about 1000° F., a LHSV within the range of about 0.1 to about 20 volumes of hydrocarbon per hour per volume of catalyst, and a hydrogen-to-hydrocarbon ratio that does not exceed 50,000 s.c.f.b.

The effluent from reaction zone 5 is passed through line 7 to high pressure separator 8 wherein the light gases containing hydrogen are separated therefrom. The separated hydrogen-containing gas is passed through line 9 to line 3 to be recycled to reaction zone 5. Make-up hydrogen is added to this hydrogen-containing gas by way of line 10. The liquid effluent from high pressure separator 8 is passed through line 11 to control valve 12, which regulates the pressure of the reaction system and permits the pressure to be reduced prior to the passage of the liquid effluent through line 13 to fractionation zone 14. In fractionation zone 14, the liquid is separated into alkanes, which have resulted from some cracking occurring in the reaction zone, benzene, toluene, xylenes, and some trimethylbenzenes. Each of these streams is separated from one another in the fractionation zone. The alkanes are removed from fractionation zone 14 by way of line 15. Benzene is removed by way of line 16, while toluene is taken from line 17 and the xylenes are removed by way of line 18. Small amounts of trimethylbenzenes are removed from fractionation zone 14 by way of line 19. Any residual hydrocarbons are removed by way of line 20.

The toluene in line 17 is conducted to line 2 where it joins the fresh feedstock from line 1 to be sent to reaction zone 5. Suitably, the xylene stream in line 18 may be sent to a second fractionation zone where the meta-xylene and para-xylene are separated from the ortho-xylene. The meta-xylene and para-xylene stream is passed to a fractional crystallization installation, where para-xylene is fractionally crystallized out of the meta-xylene. The para-xylene may be used in the manufacture of terephthalic acid, while the ortho-xylene is employed in the manufacture of phthalic anhydride. The meta-xylene may be passed to an isomerization reaction zone employing a catalyst similar to the catalyst that was used in the disproportionation reaction zone. However, in this reaction zone the meta-xylene is isomerized to an equilibrium mixture of xylenes. Any appreciable amounts of trimethylbenzenes may be separated by suitable means, such as fractional distillation, and the thusly-separated components oxidized to appropriate organic acids, if this is desirable.

EXAMPLE II

Twenty-seven catalysts were prepared as described hereinafter. These catalysts were identified as Catalysts A through Z and Catalyst AA. The ability of each of these catalysts to disproportionate toluene was obtained by testing each as described in subsequent examples.

Catalyst A was prepared to contain 9.9 weight percent nickel oxide (NiO) on a catalyst support comprising about 14 weight percent ultrastable, large-pore crystalline aluminosilicate material suspended in a matrix of low-alumina silica-alumina (about 13 weight percent alumina). A 400-gram portion of finely-divided XZ–15 cracking catalyst that was manufactured by the Davison Chemical Company (Davison No. SMR–5–61) and contained about 14 weight percent ultrastable, large-pore crystalline aluminosilicate material was impregnated with a nickelous acetate solution that was prepared by dissolving 140 grams of nickelous acetate, $Ni(C_2H_3O_2)_2 \cdot 4H_2O$, in 420 ml. of distilled water (at about 160° F.). The impregnated material was dried for about three hours in air at a temperature of 250° F., pelleted into ¼" x ¼" pellets, and calcined in air for 6 hours at a temperature of 1,000° F. For both the drying and calcining steps, an air flow rate of about 1.5 cubic feet per hour was employed. About 4% Sterotex was used as a pelleting agent. Unless otherwise specified, the drying, pelleting, and calcining of the subsequently-described catalysts were carried out under the above conditions. In each case, the calcined pellets were pulverized to provide a 12-to-20-mesh (U.S. Sieve) material.

Catalyst B was prepared to contain 9.9 weight percent nickel oxide on a catalyst support of ultrastable, large-pore crystalline aluminosilicate material. Approximately 250 grams of finely-divided ultrastable, large-pore crystalline aluminosilicate material, containing 2.20 weight percent sodium, were cation-exchanged with a solution containing 157 grams of ammonium sulfate $(NH_4)_2SO_4$, in 1.5 liters of distilled water. This cation-exchange step was carried out for 4 hours at a temperature 90° C. (194° F.). The cation-exchanged material was filtered and washed with distilled water to remove sodium and sulfate ions. The above cation-exchange technique was repeated twice. After the third exchange, the material was washed with distilled water to remove sulfate ions. The washed material was then dried, and calcined for 2 hours at a temperature of 1490° F. A 92-gram portion of this cation-exchanged ultrastable, large-pore crystalline aluminosilicate material was impregnated with a nickelous acetate solution that was prepared by dissolving 38.5 grams of nickelous acetate in 100 ml. of distilled water (at about 160° F.) containing 25 ml. of ammonium hydroxide. The impregnated material was subsequently dried, pelleted, and calcined. Calcination was carried out for a period of 4 hours. This catalyst contained 0.61 weight percent sodium.

Catalyst C was prepared to comprise a nickel-exchanged, Y-type aluminosilicate material manufactured by the Linde Division of Union Carbide Corporation. The catalyst was prepared to contain nickel in an amount of 9.9 weight percent, expressed as nickel oxide. A 150-gram fraction of sodium-form, Y-type aluminosilicate material was cation-exchanged with a nickelous nitrate solution overnight (about 16 hours) at a temperature of 90° C. (194° F.). The solution was prepared by dissolving 60 grams of nickelous nitrate, $Ni(NO_3)_2 \cdot 6H_2O$, in 2 liters of distilled water. The exchanged material was filtered and washed with distilled water. The washed material was then cation-exchanged again. After being filtered and water washed, the cation-exchanged, Y-type aluminosilicate material was dried, pelleted and calcined. This catalyst contained 2.35 weight percent sodium.

Catalyst D was prepared to comprise a physically admixed mixture of 10 weight percent nickel-exchanged, Y-type aluminosilicate material and 90 weight percent material comprising the oxides of cobalt and molybdenum on a support comprising about 14 weight percent ultrastable, large-pore crystalline aluminosilicate material suspended in a matrix of low-alumina silica-alumina. The first component, Component A, was prepared by impregnating a 90-gram portion of finely-divided XZ–15 cracking catalyst, obtained from the Davison Chemical Co., with a solution of cobalt and molybdenum ions. This solution was prepared by dissolving 5.84 grams of cobaltous nitrate $Co(NO_3)_2 \cdot 6H_2O$, in 20 ml. of distilled water (about 160° F.) and blending therewith a solution prepared by dissolving 6.06 grams of ammonium heptamolybdate, $(NH_4)_6Mo_7O_{24} \cdot 4H_2O$, in 40 ml. of distilled water (about 160° F.). The impregnated material was subsequently dried under an infrared lamp. Component A was prepared to contain 2.5 weight percent cobalt oxide and 5.0 weight percent molybdenum trioxide. Component B was prepared by cation-exchanging 150 grams of Y-type aluminosilicate material manufactured by the Linde Division of Union Carbide Corporation with a solution prepared by dissolving 60 grams of nickelous nitrate in 2 liters of distilled water (about 160° F.). The cation-exchanging was carried out at 90° C. (194° F.) overnight (about 16 hours). The cation-exchanged aluminosilicate material was filtered, washed with distilled water, and subsequently re-exchanged 3 times. After the fourth exchange, the material was filtered, washed with distilled water, dried, and calcined. A 10-gram portion of component B was physically blended with 90 grams of component A. After thorough blending, the physical particle-form mixture was pelleted into ⅛″ x ⅛″ pellets and calcined. The resultant catalyst, Catalyst D, was found to contain 7.8 weight percent nickel.

Catalyst E was prepared by the Nalco Chemical Co. using proprietary catalyst preparation techniques. This catalyst was prepared to contain 2.5 weight percent cobalt oxide and 5.0 weight percent molybdenum trioxide. The cobalt and molybdenum were introduced into a catalyst support of a commercial XZ–15 cracking catalyst prepared by the Davison Chemical Co. and comprising 7.5 weight percent ultrastable, large-pore crystalline aluminosilicate material suspended in and distributed throughout a martix of low-alumina silica-alumina cracking catalyst.

Catalyst F was prepared to contain 2.5 weight percent cobalt oxide and 5.0 weight percent molybdenum trioxide. A 100-gram portion of Filtrol-900 cracking catalyst, manufactured by Filtrol Corporation, was impregnated with a solution prepared by dissolving 8.4 grams of cobaltous acetate, $Co(C_2H_3O_2)_2 \cdot 4H_2O$, in 100 ml. of distilled water (at about 160° F.) and then dissolving 6.1 grams of ammonium heptamolybdate therein. The pH of the solution was maintained at a value of 5 by the addition of a small amount of acetic acid. The impregnated cracking catalyst was dried for 4 hours, pelleted, and calcined for 4 hours.

Catalyst G was prepared by the Nalco Chemical Co. employing proprietary catalyst preparation techniques. The catalyst support comprising about 14 weight percent ultrastable, large-pore crystalline aluminosilicate material suspended in and distributed throughout a matrix of low-alumina silica-alumina was prepared by the Davison Chemical Co. (Davison No. SMR–55–1740). Catalyst G was prepared to contain 2.5 weight percent cobalt oxide and 5.0 weight percent molybednum trioxide.

Catalyst H was prepared by the Davison Chemical Co. employing Davison cracking catalyst (Davison No. SMR 6–123–R–1) as the catalyst support. This support contained about 19 weight percent ultrastable, large-pore crystalline aluminosilicate material suspended in and distributed throughout a matrix of low-alumina silica-alumina. The support was impregnated with cobaltous acetate and ammonium heptamolybdate. Catalyst H was prepared to contain 2.5 weight percent cobalt oxide and 5.0 weight percent molybdenum trioxide.

Catalyst I was prepared by the Davison Chemical Co. employing a catalyst support containing 35 weight percent ultrastable, large-pore crystalline aluminosilicate material suspended in and distributed throughout a matrix of low-alumina silica-alumina. This support was a Davison cracking catalyst) Davison No. SMR–6–199, plant batch No. 1). The catalyst was prepared by impregnating the support with cobaltous acetate and ammonium heptamolybdate and was prepared to contain 2.5 weight percent cobalt oxide and 10.0 weight percent molybdenum trioxide.

Catalyst J was prepared to contain 2.5 weight percent cobalt oxide and 5.0 weight percent molybdenum trioxide deposited upon a support comprising ultrastable, large-pore crystalline aluminosilicate material suspended in and distributed throughout a matrix of high-alumina silica-alumina (about 25 weight percent alumina). About 250 grams of finely-divided, sodium-form, ultrastable, large-pore crystalline aluminosilicate material (containing 2.20 weight percent sodium) were cation-exchanged with a solution of ammonium sulfate prepared by dissolving 157 grams of ammonium sulfate in 1.5 liters of water for 4 hours at 90° C. (194° F.). The cation-exchanged material was filtered and washed with distilled water to remove sodium and sulfate ions, and subsequently re-exchanged two more times. After the water washing following the last exchange, the material was dried and calcined for 2 hours at 1490° F. A 35-gram portion of the cation-exchanged aluminosilicate material was blended with 750 grams of American Cyanamid high-alumina silica-alumina hydrogel and dried. The dried material was pulverized to pass through a 30-mesh screen (U.S. Sieve) and calcined for one hour. The resultant material represented the catalyst support, this was prepared to contain 35 weight percent ultrastable aluminosilicate material, and was found to contain 0.16 weight percent sodium. A 93-gram portion of this catalyst support was impregnated with a solution of cobaltous acetate and ammonium heptamolybdate prepared by dissolving 8.4 grams of cobaltous acetate and 6.1 grams of ammonium heptamolybdate in 100 ml. of distilled water (at about 160° F.). The acetate solution was adjusted to a pH of 5.5 by the addition of a small amount of acetic acid. The impregnated material was dried, pelleted, and calcined for 4 hours.

Catalyst K was prepared to contain 2.5 weight percent cobalt oxide and 5.0 weight percent molybdenum trioxide deposited upon a support comprising decationized Y-type aluminosilicate material suspended in and distributed throughout a matrix of high-alumina silica-alumina cracking catalyst. A 2,240-gram portion of American Cyanamid high-alumina silica-alumina gel (8.7 weight percent solids) was blended with 131 grams of sodium-form, Y-type aluminosilicate material (80% solids) screened to pass through a 200-mesh screen (U.S. Sieve) and prepared by the Linde Division of Union Carbide Corporation. Approximately 800 ml. of distilled water were added to the blend. The material was subsequently dried overnight (about 16 hours) and pulverized to pass through a 30-mesh screen (U.S. Sieve). The finely-divided dried material was cation-exchanged with an ammonium sulfate solution which had been prepared by dissolving 150 grams of ammonium sulfate in 2 liters of distilled water. The cation-exchanging was performed at 90° C. (194° F.) for 3 hours. The cation-exchanged material was filtered and washed with distilled water to remove sodium and sulfate ions. This cation-exchange technique was repeated 4 times with additional batches of fresh ammonium sulfate solution. After the final water washing for removal of sulfate ions, the cation-exchanged material was dried and calcined for 4 hours. A 93-gram portion of this calcined support was impregnated with a solution prepared by dissolving 8.4 grams of cobaltous acetate and 6.1 grams of ammonium heptamolybdate in 100 ml. of distilled water (at about 160° F.). A pH of 5.5 was attained by the addition of small amounts of acetic acid. After thorough blending of the solution and the catalyst support, the resultant material was dried, pelleted, and calcined for 4 hours. Catalyst K was found to contain about 35 weight percent decationized aluminosilicate material.

Catalyst L, a preferred embodiment of the catalytic composition to be used in the process of the present invention, was prepared to contain 2.5 weight percent cobalt oxide and 10 weight percent molybdenum trioxide deposited upon a catalyst support that had been prepared to contain 35 weight percent ultrastable, large-pore crystalline aluminosilicate material suspended in and distributed throughout a matrix of catalytically active alumina. Approximately 250 grams of finely-divided ultrastable, large-pore crystalline aluminosilicate material were cation-exchanged with an ammonium sulfate solution prepared by dissolving 157 grams of ammonium sulfate in 1.5 liters of distilled water. The cation-exchanging step was carried out for 4 hours at a temperature of 90° C. (194° F.). The cation-exchanged material was filtered and washed with distilled water to remove sodium and sulfate ions. The cation-exchanging step was repeated 2 times. After the final washing with distilled water, the cation-exchanged material was dried and calcined for 2 hours at 1490° F. It was subsequently re-exchanged with ammonium sulfate solution, washed with distilled water, dried and calcined for one hour at 1490° F. The sodium content was found to be 0.58 weight percent sodium. A 70-gram portion of this cation-exchanged material was blended with a 1384-gram portion of American Cyanamid alumina gel (9.4 weight percent alumina). The resultant blend was caused to gel by the addition of 100 ml. of 10% aqueous ammonium hyroxide solution, dried, and calcined for 2 hours. A 150-gram portion of the finely-divided calcined material was impregnated with a solution prepared by dissolving 14.6 grams of cobaltous acetate and 18.2 grams of ammonium heptamolybdate in 125 ml. of distilled water (at about 160° F.). A small amount of acetic acid was added to maintain a pH of 5. The impregnated catalyst support was dried, pelleted, and calcined for 4 hours.

Catalyst M was prepared to contain 2.5 weight percent cobalt oxide and 5.0 weight percent molybdenum trioxide on ultrastable, large-pore crystalline aluminosilicate material. A 92.5-gram portion of ultrastable, large-pore crystalline aluminosilicate material prepared as reported hereinabove for Catalyst B was impregnated with a solution prepared by dissolving 6.1 grams of ammonium heptamolybdate and 8.4 grams of cobaltous acetate in 120 ml. of distilled water (at about 160° F.). The pH of the solution was adjusted to about 5.0 by the addition of small amounts of acetic acid. The impregnated material was dried, pelleted into ⅛″ x ⅛″ pellets, and calcined for 4 hours.

Catalyst N was prepared to contain 2.5 weight percent cobalt oxide and 10.0 weight percent molybdenum trioxide on a decationized Y-type aluminosilicate material. An 87.5-gram portion of Y-type aluminosilicate material, obtained from the Linde Division of Union Carbide Corporation and cation-exchanged as described hereinabove for Catalyst K, was impregnated with a solution prepared by dissolving 8.4 grams of cobaltous acetate and 12.1 grams of ammonium heptamolybdate in 100 ml. of distilled water (at about 160° F.). The pH of the solution was adjusted to 5 by the addition of small amounts of acetic acid. The impregnated material was dried, pelleted, and calcined. Calcination was performed for 3 hours.

Catalyst O was prepared to contain 2.5 weight percent cobalt oxide and 10.0 weight percent molybdenum trioxide deposited upon a decationized L-type crystalline aluminosilicate material. A 250-gram portion of L-type aluminosilicate material (potassium-form) obtained from Linde Division of the Union Carbide Corporation was cation-exchanged with an ammonium nitrate solution, $NH_4NO_3$. This solution was prepared by dissolving 200 grams of ammonium nitrate in 2 liters of distilled water (at about 160° F.). The cation-exchanging was carried out for 3 hours at 90° C. (194° F.). The cation-exchanged material was filtered, washed with distilled water for removal of sodium and nitrate ions, and re-exchanged with a fresh supply of ammonium nitrate solution. The cation-exchanged material was washed with distilled water, dried, and calcined for one hour at 1490° F. The calcined material was re-exchanged two more times with fresh batches of ammonium nitrate solution. The water-washed material was dried and calcined for 4 hours. The potassium content of this material was found to be 1.98 weight percent potassium. The material was subsequently re-exchanged two times with ammonium sulfate employing the same conditions used above with ammonium nitrate solution. The final material, which was water washed, dried, and calcined, was found to contain 1.21 weight percent potassium. An 87.5-gram portion of the decationized material was then impregnated with a solution prepared by combining two solutions, one of which contained 8.4 grams of cobaltous acetate in 50 ml. of distilled water and the other of which contained 12.1 grams of ammonium heptamolybdate in 50 ml. of distilled water. The cobalt solution was adjusted to a pH of 5 by addition of acetic acid. The finely-divided, impregnated material was dried, pelleted, and calcined for 4 hours.

Catalyst P was prepared to contain 0.6 weight percent palladium deposited upon a support of about 14 weight percent ultrastable, large-pore crystalline aluminosilicate material suspended in and distributed throughout a matrix of low-alumina silica-alumina. A 100-gram portion of finely-divided Davison Chemical Co. cracking catalyst XZ–15 was impregnated with 100 ml. of a solution containing palladium. This solution was prepared by dissolving 5 grams of palladium in aqua regia, evaporating to dryness, and dissolving the residue in dilute nitric acid (about one percent $HNO_3$) to a total volume of 600 ml. The impregnated material was dried, pelleted into ⅛″ x ⅛″ pellets, and calcined.

Catalyst Q was prepared to contain 0.5 weight percent palladium deposited upon ultrastable, large-pore crystalline aluminosilicate material. A 65-gram portion of ultrastable, large-pore crystalline aluminosilicate material, cation-exchanged as described in the preparation of Catalyst B, was impregnated with a solution of diammino palladium dinitrite, $(NH_3)_2Pd(NO_2)_2$ (57% palladium), prepared by dissolving 0.57 gram of the diammino palladium dinitrite in 125 ml. of distilled water containing 2 drops of concentrated nitric acid. The impregnated material was dried for 2 hours, pelleted, and calcined for 4 hours.

Catalyst R was prepared to contain 2.5 weight percent cobalt oxide and 10.0 weight percent molybdenum trioxide deposited upon a catalyst support comprising 35 weight percent decationized Y-type crystalline aluminosilicate material suspended in and distributed throughout a matrix of slurry alumina. An 866-gram portion of alumina slurry (approximately 15 weight percent alumina) was thoroughly blended with 87.5 grams of sodium-form-Y-type aluminosilicate material (80 weight percent solids) obtained from the Linde Division of the Union Carbide Corporation. Then the blend was dried overnight (approximately 16 hours) and pulverized to pass through a 30-mesh screen (U.S. Sieve). The finely-divided material was subsequently cation-exchanged with an ammonium sulfate solution for 3 hours at a temperature of 90° C. (194° F.). This solution was prepared by dissolving 150 grams of ammonium sulfate in 3 liters of distilled water (at about 160° F.). The cation-exchanged material was filtered and washed with distilled water for removal of sodium and sulfate ions. The cation-exchanging was repeated 3 times. The material was then calcined for 3 hours. The sodium content of the cation-exchanged material was found to be 0.04 weight percent sodium. A 95-gram portion of this material was impregnated with a solution prepared by combining two other solutions, the first of which was prepared by dissolving 8.4 grams of cobaltous acetate in 70 ml. of distilled water (at approximately 160° F.) maintained at a pH of 5 by the addition of acetic acid and the second of which was prepared by dissolving ammonium heptamolybdate in 50 ml. of distilled water (at approximately 160° F.). The impregnated material was dried, pelleted, and calcined for 3 hours.

Catalyst S was prepared to contain 2.5 weight percent cobalt oxide and 10.0 weight percent molybdenum trioxide deposited upon a catalyst support comprising 35 weight percent uranium-exchanged Y-type crystalline aluminosilicate material suspended in and distributed throughout a matrix of high-alumina silica-alumina. A 250-gram portion of Y-type crystalline aluminosilicate material manufactured by the Linde Division of Union Carbide Corporation was cation-exchanged with a solution prepared by dissolving 50 grams of uranyl nitrate, $UO_2(NO_3)_2 \cdot 6H_2O$, and 150 grams of ammonium sulfate in 1 liter of distilled water (at about 160° F.). The cation-exchanging was performed for 3 hours at a temperature of 90° C. (194° F.). The cation-exchanged material was filtered and washed with distilled water (at about 160° F.), one gallon of water being divided into 500-ml. increments. The cation-exchanging was repeated with a fresh solution of ammonium sulfate and uranyl nitrate. This second cation-exchanging step was carried out overnight (about 16 hours) at a temperature of 90° C. (194° F.) with stirring. After the material was washed with distilled water as above, a third cation-exchange step was employed. Conditions were the same as those in the second cation-exchange step. The cation-exchanged material was dried and calcined for 3 hours. The calcined material contained 0.30 weight percent sodium. A 35-gram portion of the cation-exchanged material was blended into 500 grams of American Cyanamid high-alumina silica-alumina hydrogel (about 13 weight percent solids). The resultant blend was dried, calcined for 3 hours, and pulverized to pass through a 30-mesh screen (U.S. Sieve). An 88-gram portion of the 30-mesh material was impregnated with a solution prepared by combining two other solutions, the first of which was prepared by dissolving 8.4 grams of cobaltous acetate in 50 ml. of distilled water (at about 160° F.) adjusted to a pH of 5 by the addition of acetic acid and the second was prepared by dissolving 12.1 grams of ammonium heptamolybdate in 50 ml. of distilled water (at approximately 160° F.). The impregnated material was dried, pelleted, and calcined for 3 hours.

Catalyst T was prepared to contain 2.5 weight percent nickel oxide and 10.0 weight percent molybdenum trioxide deposited upon a support comprising about 35 weight percent ultrastable, large-pore crystalline aluminosilicate material suspended in and distributed throughout a matrix of low-alumina silica-alumina. A 94-gram portion of a commercially prepared cracking catalyst manufactured by the Davison Chemical Company and comprising about 35 weight percent ultrastable, large-pore crystalline aluminosilicate material suspended in and distributed throughout a matrix of low-alumina silica-alumina was impregnated with a solution prepared by combining two solutions, the first of which was prepared by dissolving 9.7 grams of nickelous nitrate in 50 ml. of distilled water (at approximately 160° F.) and the second of which was prepared by dissolving 12.1 grams of ammonium heptamolybdate in 50 ml. of distilled water (at approximately 160° F.). The impregnated material was dried for 2 hours, pelleted, and calcined for 3 hours.

Catalyst U was prepared to contain 8.0 weight percent nickel oxide and 17.2 weight percent molybdenum trioxide deposited upon a support comprising about 35 weight percent ultrastable, large-pore crystalline aluminosilicate material suspended in and distributed throughout a matrix of low-alumina silica-alumina. An 80-gram portion of the catalyst support described for Catalyst T was impregnated with a solution that had been prepared by combining two solutions, the first of which was prepared by dissolving 31 grams of nickelous nitrate in 50 ml. of distilled water (at approximately 160° F.) and the second of which was prepared by dissolving 20.9 grams of ammonium heptamolybdate in 50 ml. of distilled water (at approximately 160° F.). The impregnated material was dried for 2 hours, pelleted, and calcined for 3 hours.

Catalyst V was prepared to contain 8.0 weight percent nickel oxide and 17.2 weight percent molybdenum trioxide deposited upon a catalyst support comprising about 19 weight percent ultrastable, large-pore crystalline aluminosilicate material suspended in and distributed throughout a matrix of low-alumina silica-alumina. An 80-gram portion of a cracking catalyst obtained from the Davison Chemical Co. and comprising about 19 weight percent ultrastable, large-pore crystalline aluminosilicate material suspended in a matrix of low-alumina silica-alumina (Davison No. SMR–6–128A) was impregnated with a solution prepared by dissolving 31 grams of nickelous nitrate and 20.6 grams of ammonium heptamolybdate in 150 ml. of distilled water (at approximately 160° F.). The impregnated material was dried for 1 hour, pelleted, and calcined for 3 hours.

Catayst W was prepared to contain 10.0 weight percent molybdenum trioxide deposited upon a catalyst support comprising about 35 weight percent ultrastable, large-pore crystalline aluminosilicate material suspended in and distributed throughout a matrix of low-alumina silica-alumina. A 90-gram portion of the commercially prepared cracking catalyst employed for Catalyst T was impregnated with a solution prepared by dissolving 12.1 grams of ammonium heptamolybdate in 110 ml. of distilled water (at approximately 160° F.). This impregnated material was dried for 2 hours, pelleted, and calcined for 3 hours.

Catalyst X was prepared to contain 10.0 weight percent tungsten trioxide deposited upon a catalyst support comprising about 35 weight percent ultrastable, large-pore crystalline aluminosilicate material suspended in and distributed throughout a matrix of low-alumina silica-alumina. A 100-gram portion of the catalyst support described for Catalyst T was impregnated with a solution prepared by dissolving 10.9 grams of ammonium meta-tungstate, $(NH_4)_6H_2W_{12}O_{40} \cdot xH_2O$ (92 weight percent $WO_3$), in 150 ml. of distilled water (at approximately 160° F.). The impregnated material was dried for 2 hours, pelleted, and calcined for 3 hours.

Catalyst Y was prepared to contain 2.5 weight percent nickel oxide and 10.0 weight percent tungsten trioxide deposited upon a catalyst support comprising about 35 weight percent ultrastable, large-pore crystalline aluminosilicate material suspended in and distributed throughout a matrix of low-alumina silica-alumina. A 97-gram portion of the catalyst support described for Catalyst T was impregnated with a solution prepared by dissolving 10.9 grams of ammonium meta-tungstate and 9.7 grams of nickelous nitrate in 110 ml. of distilled water at approximately 160° F.). The impregnated material was dried for 1 hour, pelleted, and calcined for 3 hours.

Catalyst Z was prepared to contain 2.5 weight percent cobalt oxide and 10.0 weight percent molybdenum trioxide deposited upon ultrastable, large-pore crystalline aluminosilicate material. A 600-gram portion of sodium-form, Y-type crystalline aluminosilicate material manufactured by the Linde Division of Union Carbide Corporation was cation-exchanged with a solution of ammonium sulfate which had been prepared by dissolving 454 gm. of ammonium sulfate in 4 liters of distilled water (at approximately 160° F.). The cation-exchange step was carried out for 4 hours at a temperature of 90° C. (194° F.). The resultant mixture was filtered, and the solids were washed with distilled water to remove sodium and excess sulfate ions. After this cation-exchange step, the sodium content of the Y-type aluminosilicate material was found to be 3.81 weight percent. The cation-exchange step was repeated with a fresh solution of ammonium sulfate and the resultant solids were dried and calcined for 3 hours. After the second cation-exchange step, the sodium content of the aluminosilicate material was found to be 2.43 weight percent sodium. Once again the cation-exchange procedure was repeated. The sodium content of the calcined material after the third cation-exchange step was found to be 0.38 weight percent sodium. A fourth cation-exchange step was carried out and after washing with distilled water to remove sulfate ions, and calcining for 3 hours at 1500° F., the sodium content was found to be 0.192 weight percent sodium. An 87.5-gram portion of this laboratory-prepared ultrastable, large-pore crystalline aluminosilicate material was impregnated with a solution containing 8.4 grams of cobaltous acetate and 12.1 grams of ammonium heptamolybdate. Each of the above compounds was dissolved in 50 ml. batches of distilled water (at about 160° F.) and the resultant solutions were combined to provide the solution used during the impregnation. Acetic acid was added to the solution of cobaltous acetate to furnish a pH of about 5. The impregnated material was dried, pelleted into ⅛" x ⅛" pellets, and calcined for 4 hours.

Catalyst AA was prepared to contain 7.5 weight percent nickel oxide and 18 weight percent molybdenum trioxide deposited upon a support comprising ultrastable, large-pore crystalline aluminosilicate material. A 76-gram portion of the ultrastable, large-pore crystalline aluminosilicate material prepared for Catalyst Z was impregnated with a solution containing 28.9 grams of nickelous nitrate and 21.9 grams of ammonium heptamolybdate. This solution was prepared by combining individual solutions of the two compounds, each of which solutions was prepared by dissolving the particular compound in 50 ml. of distilled water (at approximately 160° F.). The impregnated material was dried, pelleted into ⅛" x ⅛" pellets, and calcined for 4 hours.

Each of the above catalysts was tested for its ability to disproportionate toluene. The feedstock that was employed in each of these tests was either a reagent grade toluene obtained from Baker and Adamson or essentially pure toluene obtained in barrel quantities from Demert and Dougherty Co.

The tests were performed in bench-scale test equipment which employed a reactor fabricated from a schedule-80 stainless steel pipe. This reactor was 20 inches long and had and I.D. of 0.622 inch. The reactor was heated externally by immersion in a constant-temperature salt bath. The temperature within the catalyst bed that was contained in the reactor was measured by means of a movable thermocouple in a coaxial thermowell which extended from the closure at the top of the reactor down through the vertical catalyst bed in the reactor. This thermowell had an O.D. of 0.125 inch. The resultant annular space within the reactor provided a space of 4.8 cc. per inch of reactor length. Each catalyst was pulverized and screened into 12-to-29-mesh granules prior to being charged to the lower section of the reactor. The catalyst loadings were varied between 4.7 and 19.5 grams of catalyst and occupied between 2 and 10 inches of reactor length. The space in the reactor above the catalyst bed was empty and served as a feed pre-heat section. The test unit was operated under once-through operation, i.e., the unit did not use recycled hydrocarbons and/or recycled hydrogen. Liquid and gaseous product streams were separated at the operating pressure. The liquid was collected in parallel high pressure receivers which were periodically isolated from the processing system and manually drained. When product samples were obtained for analytical purposes, they were collected in a small receiver during 1-hour periods at intervals of 24 hours and were analyzed by gas chromatographic methods. The bulk of the product, from overnight operation, was collected in a large receiver. The hydrogen-rich gas streams containing $C_1$- through $C_5$-hydrocarbons were analyzed by means of a gas chromatograph with a flame ionization detector and a 20' x ⅛" column of OV-1 at room temperature. The liquid product was analyzed by a temperature-programmed duel column gas chromatograph with thermal conductivity detectors and 6' x ¼" columns of SF-96.

Prior to introduction of the feed, the catalyst was treated with a hydrogen stream containing 8 volume percent hydrogen sulfide in order to sulfide the hydrogenation metals in the catalyst and to prevent the highly exothermic methanation reactor from occurring. The pre-treatment was carried out at operating pressure with a gas flow rate of 3 s.c.f.h. for 2 hours. The temperature, initially 500° F., was raised to 750° F. during the first hour of the pre-treatment and was held at 750° F. for the second hour. In those instances when the catalyst employed palladium as a hydrogenation component, the catalyst was pre-treated with hydrogen only, employing a flow rate of 2 s.c.f.h. for 4 hours at operating pressure and a temperature within the range of 700° F. to 750° F.

In general, each catalyst was tested for at least a 3-day test. The operating conditions were: a pressure of 300 p.s.i.g.; a weight hourly space velocity (WHSV) of about 1.3 to about 9.4 grams of toluene per hour per gram of catalyst; a hydrogen rate of about 20,000 s.c.f.h.; and a catalyst temperature of about 900° F. to about 960° F. The unit was operated to achieve about 35 weight percent conversion of the toluene with the once-through operation.

The activity values of the catalysts were obtained by relating the reaction rate constants at 950° F. for the various catalysts to a reaction rate constant for a reference catalyst. Catalyst L was selected as the reference catalyst. The reaction rate constants for the catalysts were calculated by using the following empirical kinetic equation:

$$K_D = 2(SV)\left[\left(\frac{1}{a-x}\right)^{0.5} - \left(\frac{1}{a}\right)^{0.5}\right]$$

where $K_D$ is the disproportionation rate constant, SV is the weight hourly space velocity expressed as grams of hydrocarbon per hour per gram of catalyst, $x$ is the weight fraction of aromatic product, and $a$ is a function of toluene concentration, $K_e$ $(1-y)$ with $K_e$ being the disproportionation equilibrium constant and $y$ being the weight fraction of non-aromatic product ($C_1$-$C_7$ saturates). The resulting $K_D$ for the specified temperature at which it was calculated was then corrected for temperature differences to 950° F. This correction was obtained by employing an activation energy ($\Delta E$) of 14 Kcal. per gram-mole and the following equation:

$$\ln K_{950} = \ln K_D + \frac{\Delta E}{1.987}\left[\frac{1.8}{T+460} - \frac{1.8}{1410}\right]$$

where T is the temperature in degrees F. at which $K_D$ was calculated. For a particular catalyst, the disproportionation rate constants at 950° F. were plotted versus days on stream on a semi-log plot and a straight line was drawn through the data points. From this line was obtained the value of the rate constant at 4 days on stream. The ratio of this rate constant to the rate constant at 4 days for the reference catalyst multiplied by 100 provided a relative activity for the particular catalyst under consideration.

Selectivity has arbitrarily been defined in terms of weight percent of non-aromatic product ($y$), i.e., $C_1$- to $C_7$-saturates, that would be obtained at 35 weight percent conversion ($c$). The relationship, $y \propto c^{1.8}$ was used to adjust the observed data to a conversion level of 35 weight percent. The values of the data were then corrected to a value that would have been obtained if the unconverted toluene were being recycled to extinction, by dividing the weight percent of $C_1$- to $C_7$-saturates in the total hydrocarbon product by 0.35.

The results of the tests of the above-described twenty-seven catalysts are presented hereinbelow in Table I. These results comprise the 4-day relative activity values and average selectivity values. Also presented in this table are the sodium contents of the catalyst supports used in the catalysts and a summary of the compositions of those catalysts.

support, the amount of ultrastable aluminosilicate material varied from about 7.5 weight percent to about 35 weight percent of the weight of the support. The hydrogenation components were combinations of the oxides of cobalt and molybdenum, the oxides of nickel and molybdenum, nickel oxide, and palladium. The results of this study are presented diagrammatically in FIG. 2 and are summarized in Table II.

TABLE I.—SUMMARY OF CATALYST PERFORMANCE

| Catalyst | Hydrogenation component, wt. percent | | | | | Catalyst support | Na, wt. percent | Relative activity | Average selectivity |
| | NiO | CoO | MoO₃ | WO₃ | Pd | Description | | | |
| --- | --- | --- | --- | --- | --- | --- | --- | --- | --- |
| A | 9.9 | | | | | 14% USAM[1] in SiO₂-Al₂O₃ | 0.06 | 17 | 7.6 |
| B | 9.9 | | | | | USAM | 0.61 | 124 | 3.6 |
| C | 9.9 | | | | | Ni-exchanged Y-type AM[2] | 2.35 | 53 | 4.7 |
| D | [3]7.8 | | | | | Physical particle mixture | | 38 | 6.0 |
| E | | 2.5 | 5 | | | 7.5% USAM in SiO₂-Al₂O₃ | 0.05 | 15 | 9.4 |
| F | | 2.5 | 5 | | | Filtrol-900 | 0.5 | 17 | 6.6 |
| G | | 2.5 | 5 | | | 14% USAM in SiO₂-Al₂O₃ | 0.06 | 27 | 10.0 |
| H | | 2.5 | 5 | | | 19% USAM in SiO₂-Al₂O₃ | 0.13 | 27 | 10.9 |
| I | | 2.5 | 10 | | | 35% USAM in SiO₂-Al₂O₃ | 0.31 | [4]79 | [4]8.0 |
| J | | 2.5 | 5 | | | do | 0.23 | 80 | 6.0 |
| K | | 2.5 | 5 | | | 35% decationized Y-type AM in SiO₂-Al₂O₃ | 0.26 | 20 | 13.4 |
| L | | 2.5 | 10 | | | 35% USAM in Al₂O₃ | 0.23 | 100 | [4]5.9 |
| M | | 2.5 | 5 | | | USAM | 0.65 | 142 | 8.9 |
| N | | 2.5 | 10 | | | Decationized Y-type AM | 0.53 | 71 | 6.9 |
| O | | 2.5 | 10 | | | Decationized L-type AM | (1.21 K) | 4 | |
| P | | | | | 0.6 | 14% USAM in SiO₂-Al₂O₃ | 0.06 | 19 | 10.3 |
| Q | | | | | 0.5 | USAM | 0.65 | 112 | 4.4 |
| R | | 2.5 | 10 | | | 35% USAM in Al₂O₃ | 0.04 | 55 | 6.8 |
| S | | 2.5 | 10 | | | 35% uranium-exchanged Y-type AM in SiO₂-Al₂O₃ | 0.30 | 86 | 7.4 |
| T | 2.5 | | 10 | | | 35% USAM in SiO₂-Al₂O₃ | 0.31 | 71 | 5.7 |
| U | 8.0 | | 17.2 | | | do | 0.31 | 79 | 5.4 |
| V | 8.0 | | 17.2 | | | 19% USAM in SiO₂-Al₂O₃ | 0.13 | 31 | 6.2 |
| W | | | 10 | | | 35% USAM in SiO₂-Al₂O₃ | 0.31 | 86 | 5.9 |
| X | | | | 10 | | do | 0.31 | 47 | 8.1 |
| Y | 2.5 | | | 10 | | do | 0.31 | 71 | 4.6 |
| Z | | 2.5 | 10 | | | USAM | 0.19 | 165 | 8.7 |
| AA | 7.5 | | 18 | | | USAM | 0.19 | 165 | 8.9 |

[1] Ultrastable, large-pore crystalline aluminosilicate material.
[2] Aluminosilicate material.
[3] Percent nickel.
[4] Average from two tests.

While the above results indicate that many of the catalysts would be suitable for disproportionation of alkylaromatic hydrocarbons, correlations presented in the following examples provide an insight into what the preferred catalytic composition should be for the disproportionation process that is disclosed herein. In these examples, various combinations of selected portions of the data obtained with the above-described catalysts are studied to show the effect of the concentration of aluminosilicate material, the effect of the type of aluminosilicate material, the effect of the type of hydrogenation component, and the effect of the type of matrix material in the support upon catalyst performance for the disproportionation of toluene.

EXAMPLE III

In this example, the data obtained from a select member of the catalysts that were prepared and tested as described hereinabove in Example II were compared to show the effect of the content of the aluminosilicate material, as well as the effect of the type of the hydrogenation component, upon relative activity. The catalysts that were employed in this example were Catalysts A, B, E, G, H, I, J, M, P, Q, U, V, Z, and AA. Each of these catalysts comprised a hydrogenation component and ultrastable, large-pore crystalline aluminosilicate material. In some cases, the ultrastable, large-pore crystalline aluminosilicate material was suspended in and distributed throughout a matrix of silica-alumina. When the silica-alumina was employed as a component of the catalyst

TABLE II.—DATA PROVIDING EFFECT OF CONCENTRATION OF ALUMINOSILICATE MATERIAL

| Catalyst | Hydrogenation component, wt. percent | | | | Support USAM,[1] wt. percent | Relative activity | Average selectivity |
| | CoO | MoO₃ | NiO | Pd | | | |
| --- | --- | --- | --- | --- | --- | --- | --- |
| A | | | 9.9 | | 14 | 17 | 7.6 |
| B | | | 9.9 | | 100 | 124 | 3.6 |
| E | 2.5 | 5.0 | | | 7.5 | 15 | 9.4 |
| G | 2.5 | 5.0 | | | 14 | 27 | 10 |
| H | 2.5 | 5.0 | | | 19 | 27 | 10.9 |
| I | 2.5 | 10.0 | | | 35 | [2]79 | [2]8.0 |
| J | 2.5 | 5.0 | | | 35 | 80 | 6.0 |
| M | 2.5 | 5.0 | | | 100 | 142 | 8.9 |
| P | | | | 0.6 | 14 | 19 | 10.3 |
| Q | | | | 0.5 | 100 | 112 | 4.4 |
| U | | 17.2 | 8.0 | | 35 | 79 | 5.4 |
| V | | 17.2 | 8.0 | | 19 | 31 | 6.2 |
| Z | 2.5 | 10.0 | | | 100 | 165 | 8.7 |
| AA | | 18.0 | 7.5 | | 100 | 165 | 8.9 |

[1] Ultrastable, large-pore crystalline aluminosilicate material.
[2] Average from two tests.

The data presented in this example, Example III, indicate that, as the concentration of the aluminosilicate material is increased, the relative activity for disproportionating toluene is increased. Furthermore, the data demonstrate the following: (1) the presence of the Group VI metal, molybdenum, with either of the Group VIII metals, cobalt and nickel, provides a more active catalyst than those containing only a Group VIII metal; (2) doubling the amount of the Gorup VI metal, molybdenum, in the catalysts containing the oxides of cobalt and molybdenum did not affect appreciably the relative activities of those catalysts; and (3) the use of either of the Group VIII metals, nickel or cobalt, with the Group VI metal, molybdenum, resulted in similar relative activity values.

It appears that the preferred catalyst support should comprise a composite of the ultrastable, large-pore crystalline aluminosilicate material and a refractory inorganic oxide. Furthermore, a preferred hydrogenation component should comprise the oxides of cobalt and molybdenum.

EXAMPLE IV

The performance of a number of catalysts having supports comprising different types of large-pore crystalline aluminosilicate material were compared in this example. These catalysts, which were prepared and tested as described in Example II, were Catalysts J, K, L, N, R, and Z. The results of the study of this example are presented diagrammatically in FIG. 3.

Figure 3:
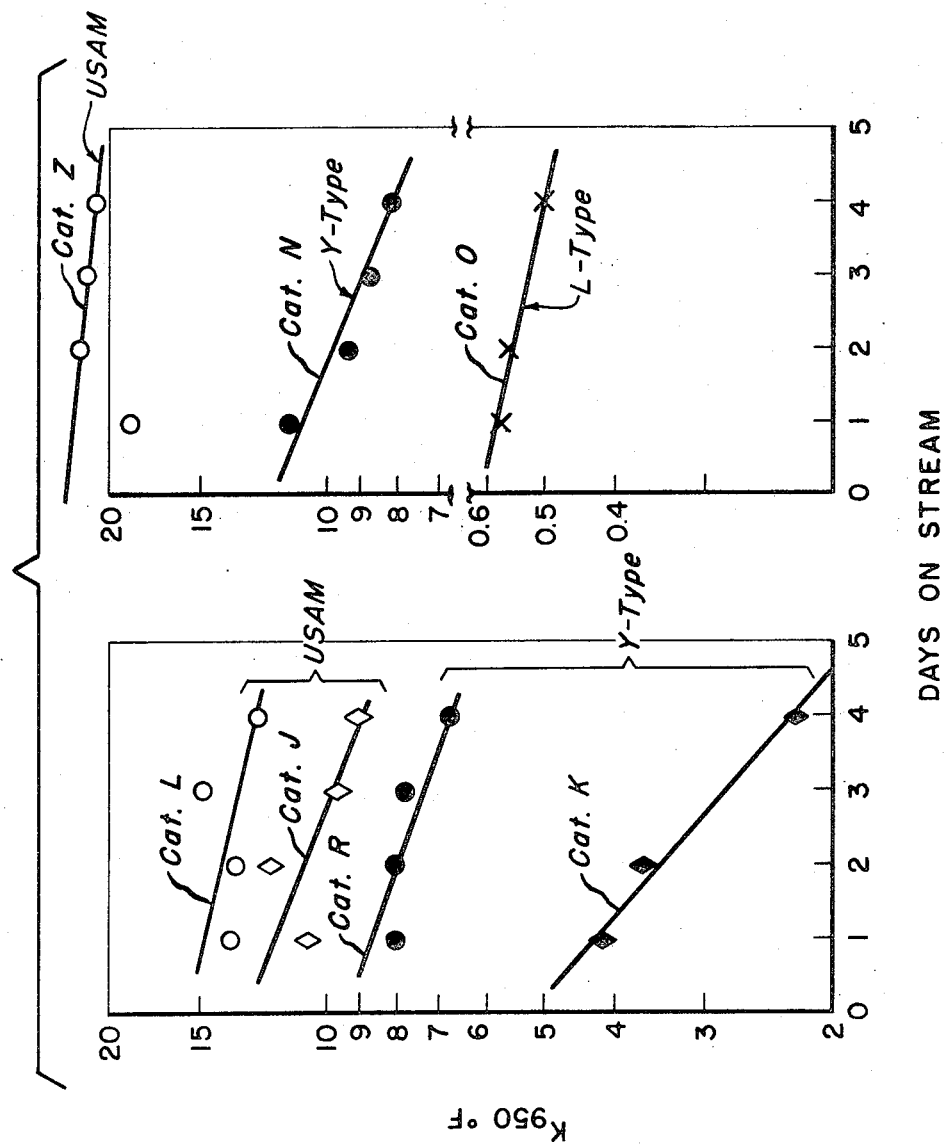
FIG. 3 demonstrates the effect of the type of aluminosilicate material on catalyst activity for the disproportionation of toluene.

Each of the catalysts had a hydrogenation component comprising the oxides of cobalt and molybdenum. The supports of Catalysts J and K comprised 35 weight percent aluminosilicate material suspended in and distributed throughout a matrix of high-alumina silica-alumina while the supports of Catalysts L and R comprised 35 weight percent aluminosilicate material suspended in and distributed throughout a matrix of catalytically active alumina. Catalysts J and L contained ultrastable, large-pore crystalline aluminosilicate material while Catalysts K and R contained Y-type aluminosilicate material. The supports of Catalysts N, O, and Z were made up of the aluminosilicate materials identified in FIG. 3. In FIG. 3, activity is expressed as the rate constant calculated for a temperature of 950° F.

The results of Example IV demonstrate that catalysts which have multi-component supports comprising alumina are more active than those which have supports comprising silica-alumina. Moreover, the activity declines exhibited by the alumina-containing catalysts are slightly better than those exhibited by the catalysts having supports comprising silica-alumina. In addition, the catalysts prepared with supports comprising ultrastable, large-pore crystalline aluminosilicate material are more active than those with supports comprising other aluminosilicate materials.

Therefore, the preferred catalyst support for the catalyst to be used in the process of the present invention comprises ultrastable, large-pore crystalline aluminosilicate material suspended in and distributed throughout a matrix of catalytically active alumina.

EXAMPLE V

Catalysts containing various hydrogenation components were compared in this example. These catalysts, which were prepared and tested as described hereinabove in Example II, were Catalysts I, T, W, X, and Y.

Each of these catalysts comprised its respective hydrogenation component deposited upon a catalyst support comprising 35 weight percent ultrastable, large-pore crystalline aluminosilicate material suspended in and distributed throughout a matrix of low-alumina silica-alumina. The hydrogenation component of Catalyst I comprised cobalt oxide and molybdenum trioxide; that of Catalyst T, nickel oxide and molybdenum trioxide; that of Catalyst W, molybdenum trioxide; that of Catalyst X, tungsten trioxide; and that of Catalyst Y, nickel oxide and tungsten trioxide.

Figure 4:
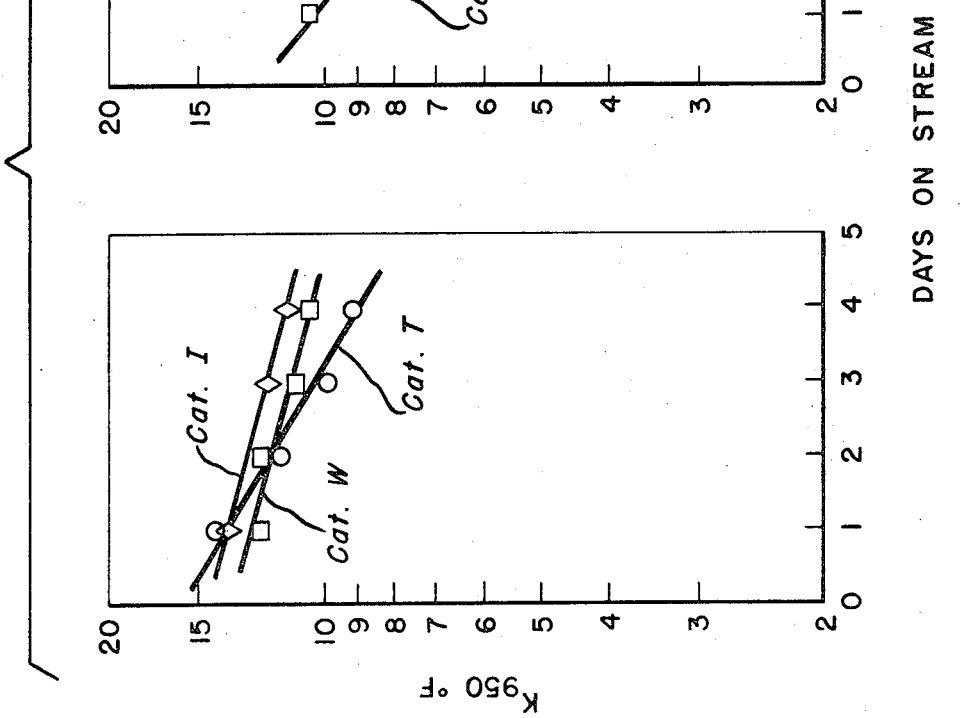
FIG. 4 shows the effect of hydrogenation components on catalyst activity for the disproportionation of toluene.

The data obtained from this example are presented diagrammatically in FIG. 4, in which activity has been expressed as the disproportionation rate constant calculated for a temperature of 950° F.

The results obtained in this example indicate that the catalyst having the hydrogenation component comprising the oxides of cobalt and molybdenum, i.e., Catalyst I, and the catalyst having the hydrogenation component comprising molybdenum trioxide, Catalyst W, provided the best activity maintenance. However, the catalyst having the hydrogenation component comprising cobalt oxide and molybdenum trioxide had a superior activity. Those catalysts having the hydrogenation components comprising the oxides of nickel and molybdenum, tungsten trioxide, or the oxides of nickel and tungsten provided catalyst deactivation rates that were inferior to those of Catalysts I and W.

When considering both activity and activity maintenance, the best catalyst appears to be the catalyst having a hydorgenation component comprising the oxides of cobalt and molybdenum. In view of this, the preferred hydrogenation component for the catalyst to be used in the process of the present invention comprises the oxides of cobalt and molybdenum.

EXAMPLE VI

The performances of six catalysts were compared to demonstrate the effect of both hydrogenation components and the concentration of aluminosilicate material upon catalyst deactivation. These six catalysts, which were prepared and tested as described in Example II, were Catalysts A, B, G, M, P, and Q. Catalysts B, M, and Q were prepared with catalyst supports of ultrastable, large-pore crystalline aluminosilicate material. Catalysts A, G, and P were prepared with catalysts supports comprising about 14 weight percent ultrastable, large-pore crystalline aluminosilicate material suspended in and distributed throughout a matrix of silica-alumina. Catalysts G and M contained hydrogenation components comprising 2.5 weight percent cobalt oxide and 5 weight percent molybdenum trioxide, based upon the weight of the catalyst. Catalysts A and B contained hydrogenation components comprising 9.9 weight percent nickel oxide, based upon the weight of the catalyst. Catalysts P and Q contained hydrogenation components comprising 0.5–0.6 weight percent palladium, based upon the weight of the catalyst. The data obtained from the study described in this example are presented diagrammatically in FIG. 5, wherein activity is expressed as the disproportionation rate constant calculated for a temperature of 950° F.

The data in FIG. 5 demonstrate that while the catalysts having the supports comprising 100 percent aluminosilicate material have much higher activities than those catalysts having supports comprising the aluminosilicate material in a matrix of silica-alumina, the latter provides a slower rate of deactivation. Furthermore, the data suggest that the catalysts having a hydrogenation component comprising the oxides of cobalt and molybdenum are more active than the other catalysts, which employ either nickel or palladium hydrogenation components.

These results confirm the data of the previous examples that the oxides of cobalt and molybdenum constitute a preferred hydrogenation component and that a support comprising ultrastable, large-pore crystalline aluminosilicate material and a refractory inorganic oxide is a preferred catalyst support for the catalysts of the process of the present invention.

EXAMPLE VII

Catalyst L, a preferred embodiment of the catalyst to be used in the process of the present invention, was examined for its regenerability. It was prepared and tested as described in Example II hereinabove. A 5.2-gram portion of Catalyst L, in the form 12-to-20-mesh granules, was charged to the reactor and was tested for a period of 125 days on stream. The catalyst was found to have lost about 60 percent of its initial activity during this 125-day operation. It was then removed from the reactor and regenerated as described hereinbelow. The regenerated catalyst was subsequently tested in a second cycle for 28 days as described in Example II. Activity data obtained from this second cycle are compared in FIG. 6 to those obtained from the first 28 days of the first-cycle operation. Activity is expressed in terms of the disproportionation rate constant calculated for a temperature of 950° F.

Operating conditions for the first 28 days of the first cycle were: a pressure of 300 p.s.i.g.; a hydrogen addition rate of 20,000 s.c.f.b.; a temperature of 948° F. to 970° F., and a WHSV of 7.86 grams of toluene per hour per gram of catalyst.

After the first cycle, the flow of toluene was discontinued and the reactor was cooled to a temperature of 550° F. in two hours in the presence of flowing hydrogen. Then the reactor was depressured and the catalyst was removed therefrom. This deactivated catalyst was black and free-flowing. Examination of the catalyst revealed that a black magnetic scale had also been removed therewith and that the source of this scale was the reactor wall in the catalyst zone. The catalyst was placed in a ceramic boat and spread in a layer having a depth of about ⅛ inch. The boat containing the catalyst was placed subsequently in a small calcining furnace after a thermocouple had been placed in the catalyst mass. This thermocouple was used to measure the temperature of the catalyst mass. A gentle flow of air was passed through the furnace and the temperature was raised to 700° F. in one hour. Thereafter, 50° F.-incremental temperature increases were made every ½ hour up to a temperature of 850° F., and this procedure was followed by 50° F. increments every two hours until a maximum temperature of 1,000° F. was attained. At 1,000° F., the color of the catalyst had changed from black to gray and finally to a blue-gray. After two hours, the temperature was increased to 1,050° F., at which level it was held for ½ hour. The temperature was then lowered to room temperature. This calcining treatment reduced the weight of the catalyst by one-third, which weight reduction would be equivalent to 50 weight percent coke, based upon the weight of fresh catalyst. This amount of coke represents 0.002 weight percent of the total feed that was passed over the catalyst.

The regenerated catalyst was returned to the reactor and the second processing cycle was performed. Prior to the second cycle, the catalyst was pretreated with a gas mixture of 8 percent hydrogen-sulfide in hydrogen. The testing was conducted as described in Example II hereinabove. The processing conditions employed in this second cycle were the same as those employed in the first cycle, with the exception of a slightly higher WHSV. The WHSV of the second cycle was 8.40 grams of toluene per hour per gram of catalyst.

FIG. 6 compares the activity data obtained from the first cycle of operation to those obtained from the second cycle of operation. After 4 weeks of testing, the activity and activity maintenance obtained for the catalyst in the second cycle were equivalent to their respective counter-parts obtained for the catalyst in the first cycle of operation. Hence, Catalyst L, a preferred embodiment of the catalyst to be used in the process of the present invention, can be regenerated successfully.

Figure 2:
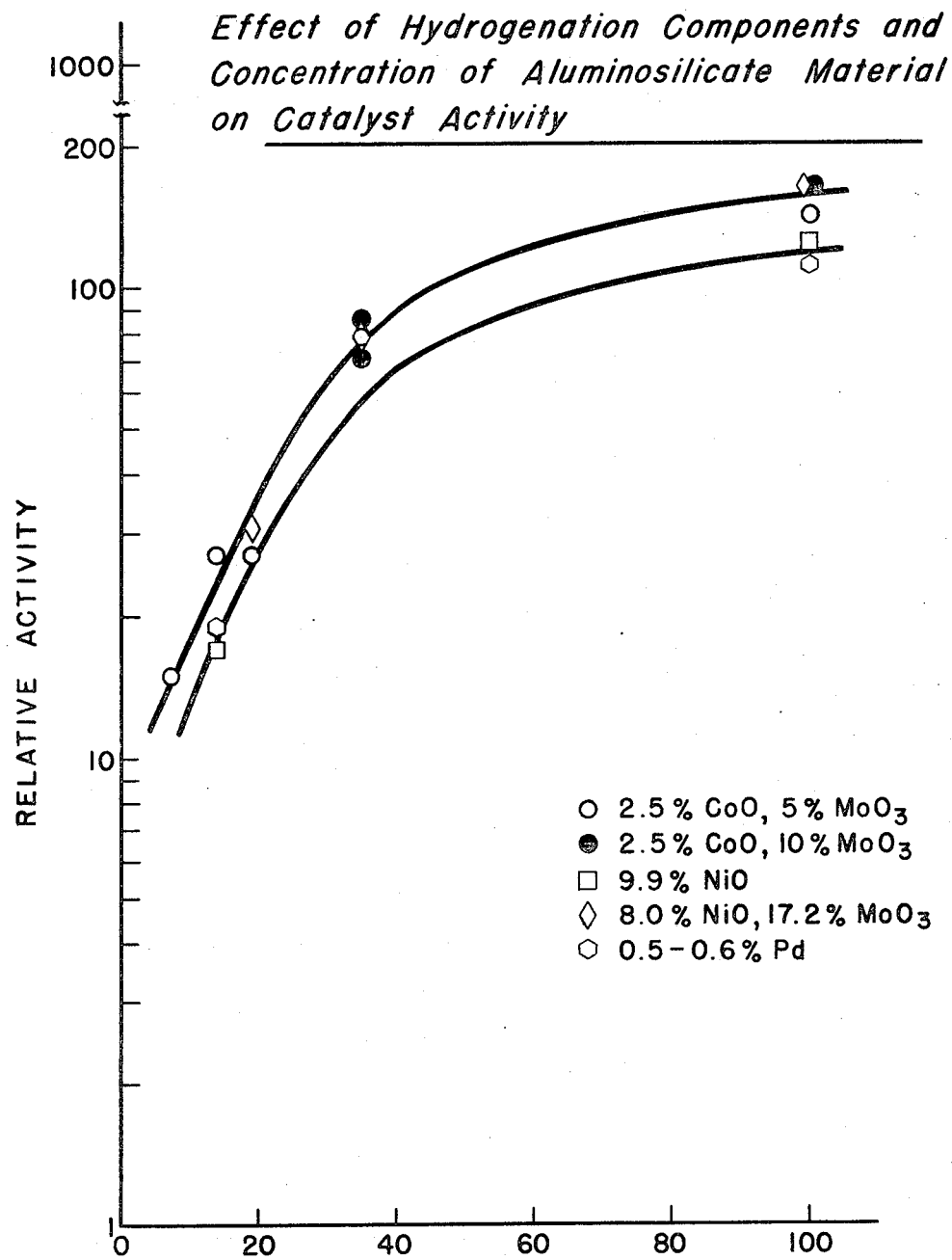
FIG. 2 exhibits the effect of hydrogenation components and the concentration of aluminosilicate material on catalyst activity for the disproportionation of toluene.

In summary, the catalyst providing the best performance was Catalyst L, which was prepared to contain 2.5 weight percent cobalt oxide and 10 weight percent molybdenum trioxide deposited upon a catalyst support that had been prepared to contain 35 weight percent ultrastable, large-pore crystalline aluminosilicate material suspended in and distributed throughout a matrix of catalytically active alumina. FIGS. 2 and 4 showed that catalysts having a hydrogenation component comprising the oxides of cobalt and molybdenum provided the best activity and the best activity maintenance. FIG. 3 indicated that the catalyst containing ultrastable, large-port crystalline aluminosilicate material provided superior activity over catalysts comprising other aluminosilicate materials. FIG. 5 showed that while activity depends upon the concentration of the aluminosilicate material in the support of the particular catalyst, a support made up entirely of aluminosilicate material provided an activity decline that was greater than the activity decline for a catalyst having a support comprising the aluminosilicate material suspended in and distributed throughout a matrix of a refractory inorganic-oxide material. FIG. 6 exhibited the regenerability of a catalyst comprising the oxides of cobalt and molybdenum on a support comprising ultrastable, large-pore crystalline aluminosilicate material suspended in and distributed throughout a matrix of a refractory inorganic oxide. In view of the above, a preferred embodiment of the catalyst to be employed in the process of the present invention is a catalyst which comprises the oxides of cobalt and molybdenum deposited upon a catalyst support comprising ultrastable, large-pore crystalline aluminosilicate material suspended in and distributed throughout a matrix of catalytically active alumina. In another preferred embodiment of the catalyst, the refractory inorganic oxide may be an amorphous silica-alumina cracking catalyst.

While one of the above preferred catalysts is suggested for use in the process of the present invention, selected processing situations might warrant the use of one of the other catalysts disclosed herein.

The hereinabove-described examples demonstrate the potential of the process of the present invention to disproportionate alkyl aromatic hydrocarbons.

What is claimed is:

1. A process for the disproportionation of petroleum hydrocarbons, which process comprises contacting in a reaction zone said petroleum hydrocarbons with a catalytic composition under suitable disproportionation conditions, said catalytic composition comprising a member selected from the group consisting of (1) a metal of Group VI–B of the Periodic Table of Elements, (2) a metal of Group VIII of the Periodic Table, (3) the oxide of a metal of Group VI–B, (4) the sulfide of a metal of Group VI–B, (5) the oxide of a metal of Group VIII, (6) the sulfide of a metal of Group VIII, and (7) mixtures thereof deposited upon an acidic cracking component comprising an ultrastable, large-pore crystalline aluminosilicate material and a refractory inorganic oxide, said ultrastable, large-pore crystalline aluminosilicate material being suspended in and dispersed throughout a matrix of said refractory inorganic oxide.

2. The process of claim 1 wherein said refractory inorganic oxide of said catalytic composition comprises a silica-alumina cracking catalyst.

3. The process of claim 1 wherein said refractory inorganic oxide of said catalytic composition comprises a catalytically active alumina.

4. The process of claim 1 wherein said ultrastable, large-pore crystalline aluminosilicate material is present in said catalytic composition in an amount within the range of about 5 weight percent to about 90 weight percent, based upon the weight of said catalyst support, a substantial amount of said ultrastable, large-pore crystalline aluminosilicate material being characterized by well-defined hydroxyl infrared bands near 3700 cm.$^{-1}$ and near 3625 cm.$^{-1}$, and said ultrastable, large-pore crystalline aluminosilicate material being characterized further by an alkali metal content that is less than one weight percent, a maximum cubic unit cell dimension of 24.55 A., and a superior ability to withstand repeated wetting-drying cycles.

5. The process of claim 1 wherein said Group VIII metal of said catalytic composition is cobalt and said Group VI–B metal is molybdenum, said cobalt being present in an amount within the range of about 2 weight percent to about 5 weight percent, expressed as CoO and based upon the total weight of said catalytic composition, said molybdenum being present in an amount within the range of about 4 weight percent to about 15 weight percent, expressed as $MoO_3$ and based upon the total weight of said catalytic composition.

6. The process of claim 1 wherein said suitable disproportionation conditions comprise a temperature within the range of about 700° F. to about 1,100° F., a pressure within the range of about 100 p.s.i.g. to about 1,000 p.s.i.g., a LHSV within the range of about 0.1 to about 20 volumes of hydrocarbon per hour per volume of catalyst, and a hydrogen-to-oil ratio within the range of about 1,000 s.c.f.b. to about 50,000 s.c.f.b.

7. The process of claim 1 wherein said suitable disproportionation conditions comprise a temperature within the range of about 850° F. to about 1,000° F., a pressure within the range of about 200 p.s.i.g. to about 500 p.s.i.g., a LHSV within the range of about 0.1 to about 10 volumes of hydrocarbon per hour per volume of catalyst and a hydrogen-to-oil ratio within the range of about 5,000 s.c.f.b. to about 30,000 s.c.f.b.

8. The process of claim 2 wherein said ultrastable, large-pore crystalline aluminosilicate material is present in said catalytic composition in an amount within the range of about 5 weight percent to about 90 weight percent, based upon the weight of said catalyst support, a substantial amount of said ultrastable, large-pore crystalline aluminosilicate material being characterized by well-defined hydroxyl infrared bands near 3700 cm.$^{-1}$ and near 3625 cm.$^{-1}$, and said ultrastable, large-pore crystalline aluminosilicate material being characterized further by an alkali metal content that is less than one weight percent, a maximum cubic unit cell dimension of 24.55 A., and a superior ability to withstand repeated wetting-drying cycles.

9. The process of claim 2 wherein said Group VIII metal of said catalytic composition is cobalt and said Group VI–B metal is molybdenum, said cobalt being present in an amount within the range of about 2 weight percent to about 5 weight percent, expressed as CoO and based upon the total weight of said catalytic composition, said molybdenum being present in an amount within the range of about 4 weight percent to about 15 weight percent, expressed as $MoO_3$ and based upon the total weight of said catalytic composition.

10. The process of claim 2 wherein said suitable disproportionation conditions comprise a temperature within the range of about 700° F. to about 1,100° F., a pressure within the range of about 100 p.s.i.g. to about 1,000 p.s.i.g., a LHSV within the range of about 0.1 to about 20 volumes of hydrocarbon per hour per volume of catalyst, and a hydrogen-to-oil ratio within the range of about 1,000 s.c.f.b. to about 50,000 s.c.f.b.

11. The process of claim 3 wherein said ultrastable, large-pore crystalline aluminosilicate material is present in said catalytic composition in an amount within the range of about 5 weight percent to about 90 weight percent, based upon the weight of said catalyst support, a substantial amount of said ultrastable, large-pore crystalline aluminosilicate material being characterized by well-defined hydroxyl infrared bands near 3700 cm.$^{-1}$ and near 3625 cm.$^{-1}$, and said ultrastable, large-pore crystalline aluminosilicate material being characterized further by an alkali metal content that is less than one weight percent, a maximum cubic unit cell dimension of 24.55 A., and a superior ability to withstand repeated wetting-drying cycles.

12. The process of claim 3 wherein said Group VIII metal of said catalytic composition is cobalt and said Group VI–B metal is molybdenum, said cobalt being present in an amount within the range of about 2 weight percent to about 5 weight percent, expressed as CoO and based upon the total weight of said catalytic composition, said molybdenum being present in an amount within the range of about 4 weight percent to about 15 weight percent, expressed as $MoO_3$ and based upon the total weight of said catalytic composition.

13. The process of claim 9 wherein said suitable disproportionation conditions comprise a temperature within the range of a bout 700° F. to about 1,100° F., a pressure within the range of about 100 p.s.i.g. to about 1,000 p.s.i.g., a LHSV within the range of about 0.1 to about 20 volumes of hydrocarbon per hour per volume of catalyst, and a hydrogen-to-oil ratio within the range of about 1,000 s.c.f.b. to about 50,000 s.c.f.b.

14. The process of claim 3 wherein said suitable disproportionation conditions comprise a temperature within the range of about 850° F. to about 1,000° F., a pressure within the range of about 200 p.s.i.g. to about 500 p.s.i.g., a LHSV within the range of about 0.1 to about 10 volumes of hydrocarbon per hour per volume of catalyst, and a hydrogen-to-oil ratio within the range of about 5,000 s.c.f.b. to about 30,000 s.c.f.b.

15. The process of claim 6 wherein a sulfur-providing compound is added to said reaction zone in a substantial amount, said substantial amount being sufficient to effectively inhibit demethanation in said reaction zone.

16. The process of claim 7 wherein a sulfur-providing compound is added to said reaction zone in a substantial amount, said substantial amount being sufficient to effectively inhibit demethanation in said reaction zone.

17. The process of claim 8 wherein said Group VIII metal of said catalytic composition is cobalt and said Group VI–B metal is molybdenum, said cobalt being present in an amount within the range of about 2 weight percent to about 5 weight percent, expressed as CoO and based upon the total weight of said catalytic composition, said molybdenum being present in an amount within the range of about 4 weight percent to about 15 weight percent, expressed as $MoO_3$ and based upon the total weight of said catalytic composition.

18. The process of claim 8 wherein said suitable disproportionation conditions comprise a temperature within the range of about 700° F .to about 1,100° F., a pressure within the range of about 100 p.s.i.g. to about 1,000 p.s.i.g., a LHSV within the range of about 0.1 to about 20 volumes of hydrocarbon per hour per volume of catalyst, and a hydrogen-to-oil ratio within the range of about 1,000 s.c.f.b. to about 50,000 s.c.f.b.

19. The process of claim 8 wherein said suitable disproportionation conditions comprise a temperature within the range of about 850° F. to about 1,000° F., a pressure within the range of about 200 p.s.i.g. to about 500 p.s.i.g., a LHSV within the range of about 0.1 to about 10 volumes of hydrocarbon per hour per volume of catalyst, and a hydrogen-to-oil ratio within the range of about 5,000 s.c.f.b. to about 30,000 s.c.f.b.

20. The process of claim 9 wherein said suitable disproportionation conditions comprise a temperature within the range of about 700° F. to about 1,100° F., a pressure within the range of about 100 p.s.i.g. to about 1,000 p.s.i.g., a LHSV within the range of about 0.1 to about 20 volumes of hydrocarbon per hour per volume of catalyst, and a hydrogen-to-oil ratio within the range of about 1,000 s.c.f.b. to about 50,000 s.c.f.b.

21. The process of claim 10 wherein a sulfur-providing compound is added to said reaction zone in a substantial amount, said substantial amount being sufficient to effectively inhibit demethanation in said reaction zone.

22. The process of claim 11 wherein said Group VIII metal of said catalytic composition is cobalt and said Group VI–B metal is molybdenum, said cobalt being present in an amount within the range of about 2 weight percent to about 5 weight percent, expressed as CoO and based upon the total weight of said catalytic composition, said molybdenum being present in an amount within the range of about 4 weight percent to about 15 weight percent, expressed as $MoO_3$ and based upon the total weight of said catalytic composition.

23. The process of claim 11 wherein said suitable disproportionation conditions comprise a temperature within the range of about 700° F. to about 1,100° F., a pressure within the range of about 100 p.s.i.g. to about 1,000 p.s.i.g. a LHSV within the range of about 0.1 to about 20 volumes of hydrocarbon per hour per volume of catalyst, and a hydrogen-to-oil ratio within the range of about 1,000 s.c.f.b. to about 50,000 s.c.f.b.

24. The process of claim 11 wherein said suitable disproportionation conditions comprise a temperature within the range of about 850° F. to about 1,000° F., a pressure within the range of about 200 p.s.i.g. to about 500 p.s.i.g., a LHSV within the range of about 0.1 to about 10 volumes of hydrocarbon per hour per volume of catalyst, and a hydrogen-to-oil ratio within the range of about 5,000 s.c.f.b. to about 30,000 s.c.f.b.

25. The process of claim 13 wherein a sulfur-providing compound is added to said reaction zone in a substantial amount, said substantial amount being sufficient to effectively inhibit demethanation in said reaction zone.

26. The process of claim 14 wherein a sulfur-providing compound is added to said reaction zone in a substantial amount, said substantial amount being sufficient to effectively inhibit demethanation in said reaction zone.

27. The process of claim 17 wherein said suitable disproportionation conditions comprise a temperature within the range of about 700° F. to about 1,100° F., a pressure within the range of about 100 p.s.i.g. to about 1,000 p.s.i.g., a LHSV within the range of about 0.1 to about 20 volumes of hydrocarbon per hour per volume of catalyst, and a hydrogen-to-oil ratio within the range of about 1,000 s.c.f.b. to about 50,000 s.c.f.b.

28. The process of claim 17 wherein said suitable disproportionation conditions comprise a temperature within the range of about 850° F. to about 1,000° F., a pressure within the range of about 200 p.s.i.g. to about 500 p.s.i.g., a LHSV within the range of about 0.1 to about 10 volumes of hydrocarbon per hour per volume of catalyst, and a hydrogen-to-oil ratio within the range of about 5,000 s.c.f.b. to about 30,000 s.c.f.b.

29. The process of claim 18 wherein a sulfur-providing compound is added to said reaction zone in a substantial amount, said substantial amount being sufficient to effectively inhibit demethanation in said reaction zone.

30. The process of claim 19 wherein a sulfur-providing compound is added to said reaction zone in a substantial amount, said substantial amount being sufficient to effectively inhibit demethanation in said reaction zone.

31. The process of claim 20 wherein a sulfur-providing compound is added to said reaction zone in a substantial amount, said substantial amount being sufficient to effectively inhibit demethanation in said reaction zone.

32. The process of claim 22 wherein said suitable disproportionation conditions comprise a temperature within the range of about 700° F. to about 1,100° F., a pressure within the range of about 100 p.s.i.g. to about 1,000 p.s.i.g., a LHSV within the range of about 0.1 to about 20 volumes of hydrocarbon per hour per volume of catalyst, and a hydrogen-to-oil ratio within the range of about 1,000 s.c.f.b. to about 50,000 s.c.f.b.

33. The process of claim 22 wherein said suitable disproportionation conditions comprise a temperature within the range of about 850° F. to about 1,000° F., a pressure within the range of about 200 p.s.i.g. to about 500 p.s.i.g., a LHSV within the range of about 0.1 to about 10 volumes of hydrocarbon per hour per volume of catalyst, and a hydrogen-to-oil ratio within the range of about 5,000 s.c.f.b. to about 30,000 s.c.f.b.

34. The process of claim 23 wherein a sulfur-providing compound is added to said reaction zone in a substantial amount, said substantial amount being sufficient to effectively inhibit demethanation in said reaction zone.

35. The process of claim 24 wherein a sulfur-providing compound is added to said reaction zone in a substantial amount, said substantial amount being sufficient to effectively inhibit demethanation in said reaction zone.

36. The process of claim 27 wherein a sulfur-providing compound is added to said reaction zone in a substantial amount, said substantial amount being sufficient to effectively inhibit demethanation in said reaction zone.

37. The process of claim 28 wherein a sulfur-providing compound is added to said reaction zone in a substantial amount, said substantial amount being sufficient to effectively inhibit demethanation in said reaction zone.

38. The process of claim 32 wherein a sulfur-providing compound is added to said reaction zone in a substantial amount, said substantial amount being sufficient to effectively inhibit demethanation in said reaction zone.

39. The process of claim 33 wherein a sulfur-providing compound is added to said reaction zone in a substantial amount, said substantial amount being sufficient to effectively inhibit demethanation in said reaction zone.

References Cited

UNITED STATES PATENTS

| | | | |
|---|---|---|---|
| 3,562,345 | 2/1971 | Mitsche et al. | 260—672 I |
| 3,377,400 | 4/1968 | Wise | 260—668 A |
| 3,516,925 | 6/1970 | Lawrence et al. | 260—672 I |
| 3,476,821 | 11/1969 | Brandenburg et al. | 260—672 I |
| 3,281,483 | 10/1966 | Benesi et al. | 260—672 I |
| 3,281,482 | 10/1966 | Dvoretzky et al. | 260—668 A |
| 2,784,241 | 3/1957 | Holm | 260—668 A |
| 3,548,020 | 12/1970 | Gutberlet et al. | 260—668 A |

HELEN M. S. SNEED, Primary Examiner

U.S. Cl. X.R.

260—668 A

PO-1050
(5/69)

UNITED STATES PATENT OFFICE
CERTIFICATE OF CORRECTION

Patent No. 3,729,521   Dated April 24, 1973

Inventor(s) Louis C. Gutberlet, Ralph J. Bertolacini and Harry M. Brennan

It is certified that error appears in the above-identified patent and that said Letters Patent are hereby corrected as shown below:

Column 5, line 3, "For the" should be -- For use --;
    line 53, "characteristics" should be -- characteristic --.

Column 6, line 18, "alkali content" should be -- alkali metal content --.

Column 15, line 36, "1/6" should be -- 1/8 --;
    line 57, "29" should be -- 20 --.

Column 16, line 4, "duel" should be -- dual --;
    line 25, "s.c.f.h." should be -- s.c.f.b. --.

Column 23, line 73, "9" should be -- 3 --;
    line 75, "a bout" should be -- about --.

Column 24, line 74, "1,000 p.s.i.g." should be -- 1,000 p.s.i.g., --.

Signed and sealed this 9th day of July 1974.

(SEAL)
Attest:

McCOY M. GIBSON, JR.
Attesting Officer

C. MARSHALL DANN
Commissioner of Patents